July 4, 1961    L. A. WILSON ET AL    2,990,956
RECORD SORTING MACHINE
Filed Dec. 21, 1953    14 Sheets-Sheet 4

INVENTORS
LAWRENCE A. WILSON
GEORGE A. LUNING
BY
Burton P. Beatty
ATTORNEY

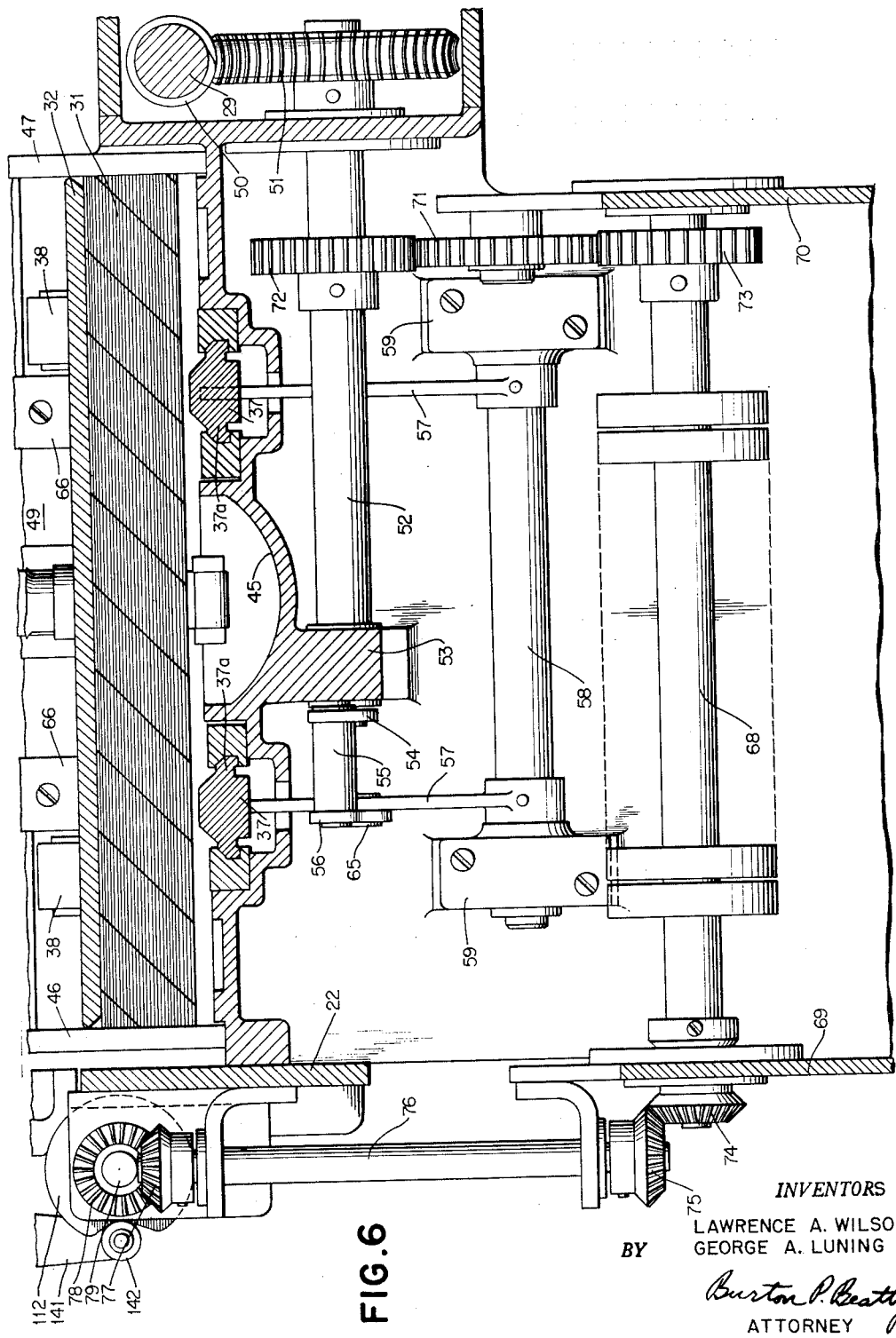

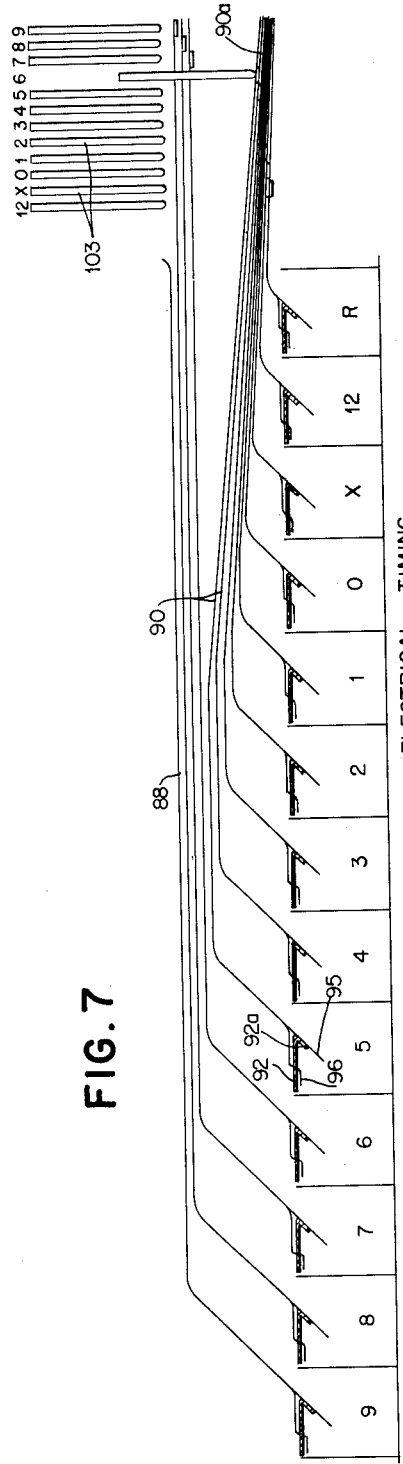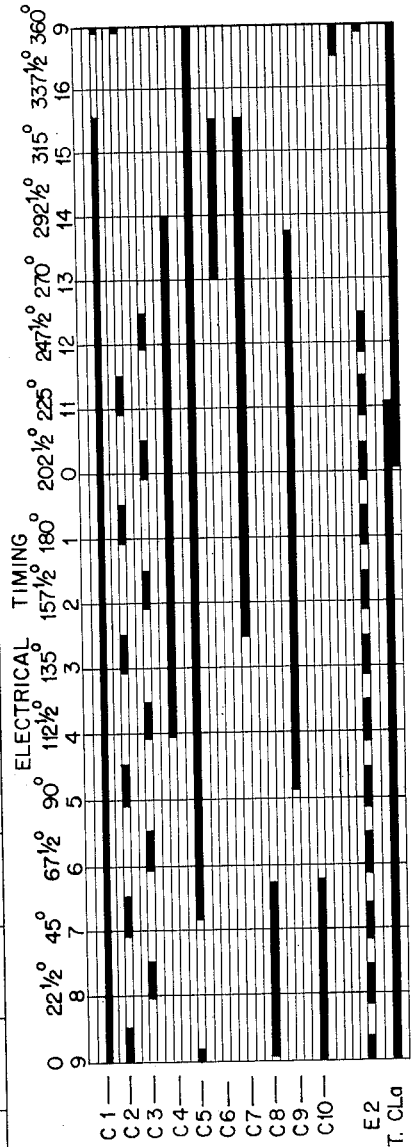

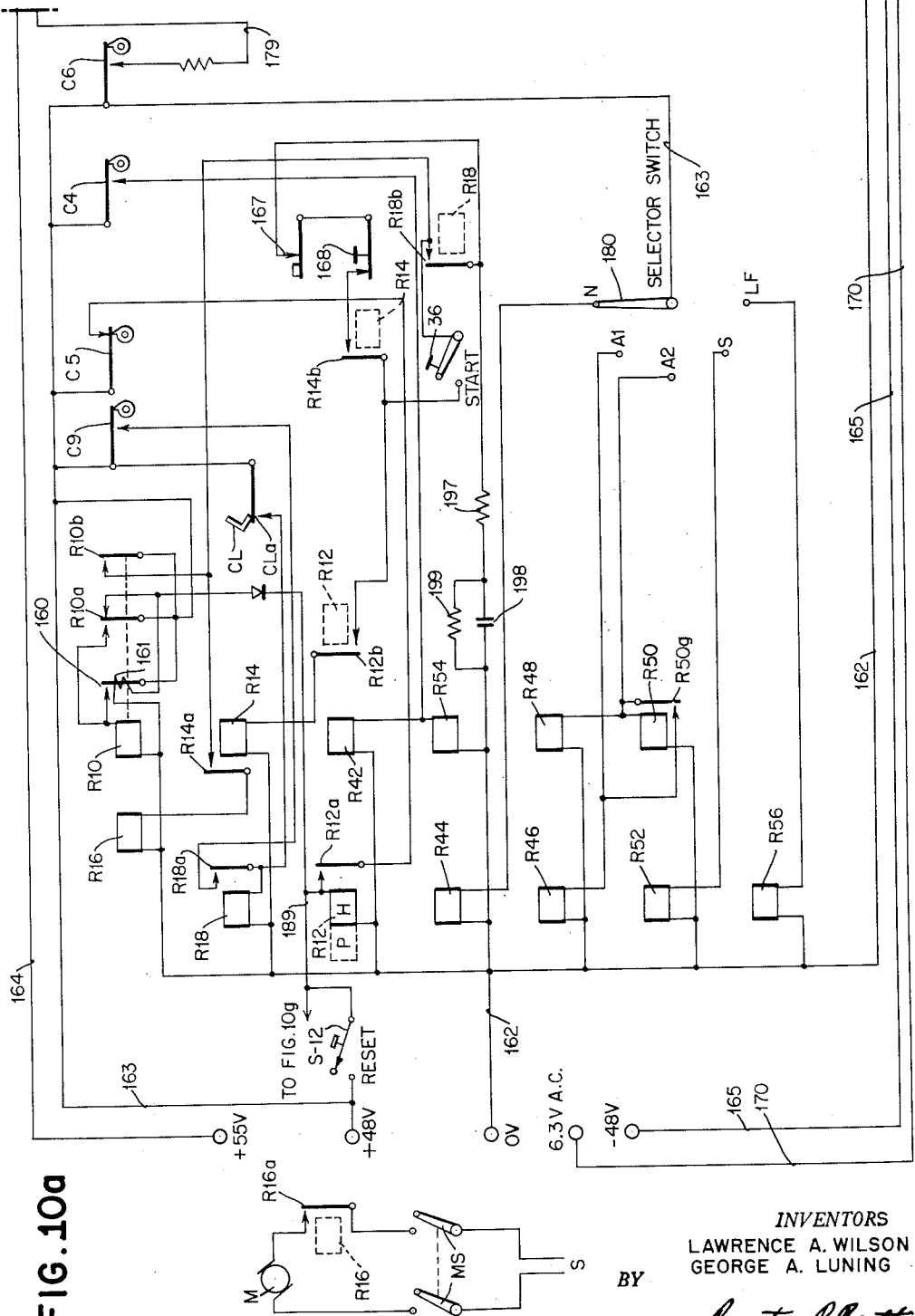

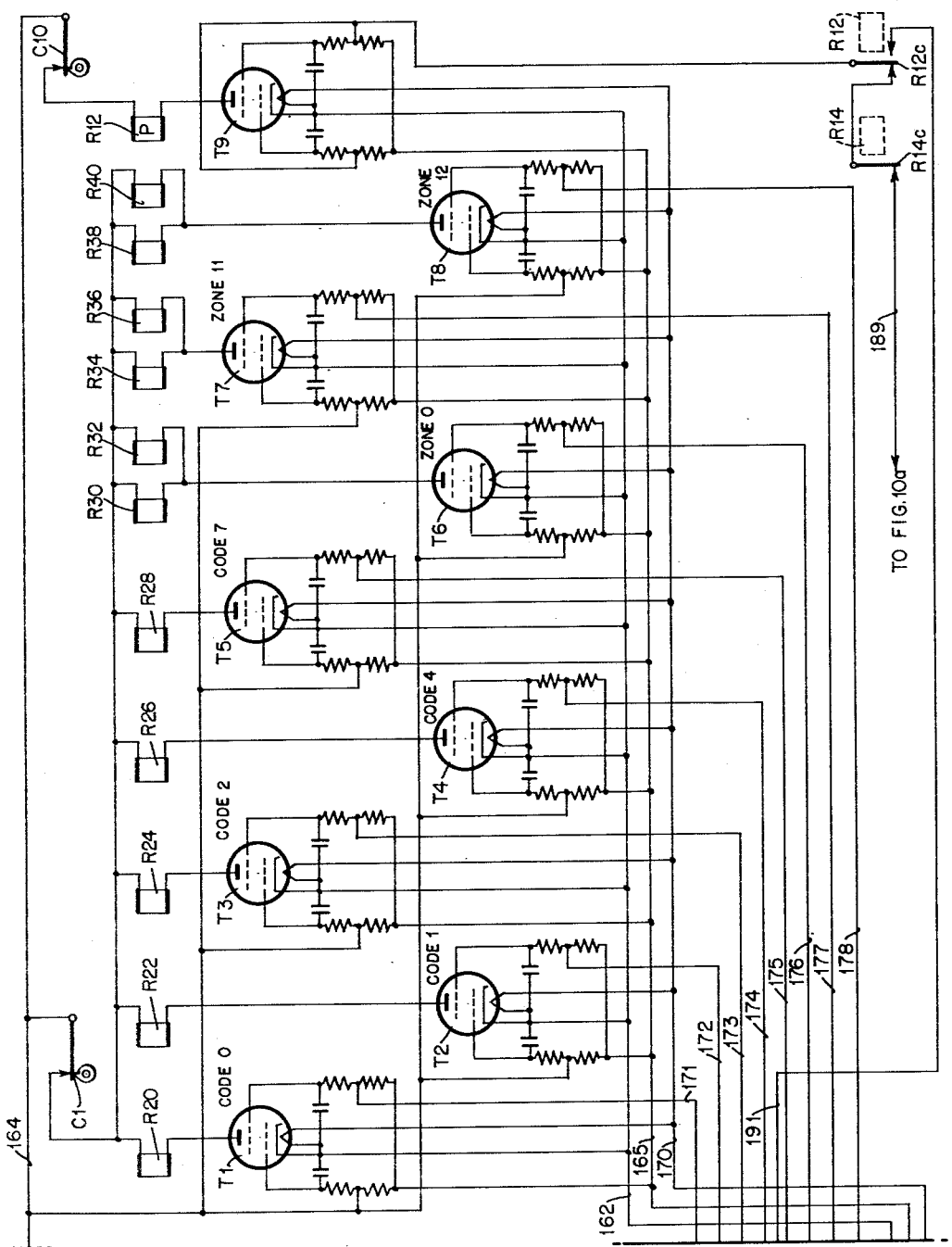

United States Patent Office 2,990,956
Patented July 4, 1961

2,990,956
RECORD SORTING MACHINE
Lawrence A. Wilson, Apalachian, and George A. Luning, Endicott, N.Y., assignors to International Business Machines Corporation, New York, N.Y., a corporation of New York
Filed Dec. 21, 1953, Ser. No. 399,342
10 Claims. (Cl. 209—110)

This invention relates to card controlled machines in general and more particularly to those adapted to sort record cards such as are used to control the operation of the well known IBM type of accounting machine.

The principal object of the present invention is to provide an improved machine for sorting cards which is capable of operation at high speeds.

An object of the invention is to provide an improved means for effecting the selection of the passage or chutes to the various card receiving stations.

Another object of the invention is to provide an improved mechanism in which the whole card cycle is utilized to effect entry of a card into the distributing blades.

A further object of the invention is to provide means at each receiving station which cooperates with the distributing blades to guide a card into the receiving station.

Yet another object of the invention is to provide a novel sorting system in which the sorting of cards is accomplished in a relatively short period of time with a minimum of card handling operations.

Still another object of the invention is to provide a novel means for checking the proper selection of passages to the various receiving stations.

In the machine of the present invention, thirteen sorting pockets are employed for receiving the individual cards according to the code perforations applied. During sorting operations, cards are passed through the sensing station face downward with the bottom longitudinal edge leading. A separate sort magnet is utilized to control the selection of each distributing blade. In order to accomplish the high speed actuation of these blades and make possible the energization of the sort magnets at the proper time for introduction of the card beneath the proper distributing blade, certain electronic circuits are brought into play. A card deflecting plate is located above each sorting pocket and extends between the machine side frames to cooperate with the distributing blades in directing the card into the assigned pocket. An electronic checking circuit is included wherein the mechanism for actuating a distributing blade is compared with the sort magnet which has been energized to control the blade selection.

Other objects of the invention will be pointed out in the following description and claims and illustrated in the accompanying drawings, which disclose, by way of example, the principle of the invention and the best mode, which has been contemplated, of applying that principle.

In the drawings:

FIG. 6 is an end view partly broken away, showing the drive for the pocket selecting mechanism.

FIG. 7 is a diagrammatic showing of the selection of a distributing blade and card passage formed thereby.

FIG. 8 is a sectional view taken along line 8—8 of FIG. 3 showing the arrangement of the distributing blades.

FIG. 9 is a timing diagram showing the timing desirable to close certain electrical contacts and the timing of the cam which actuates the blade selecting mechanism.

FIGS. 10a to 10g placed side by side comprise an electrical wiring diagram of the preferred form of the invention.

GENERAL CONSTRUCTION AND OPERATION

Figure 1:
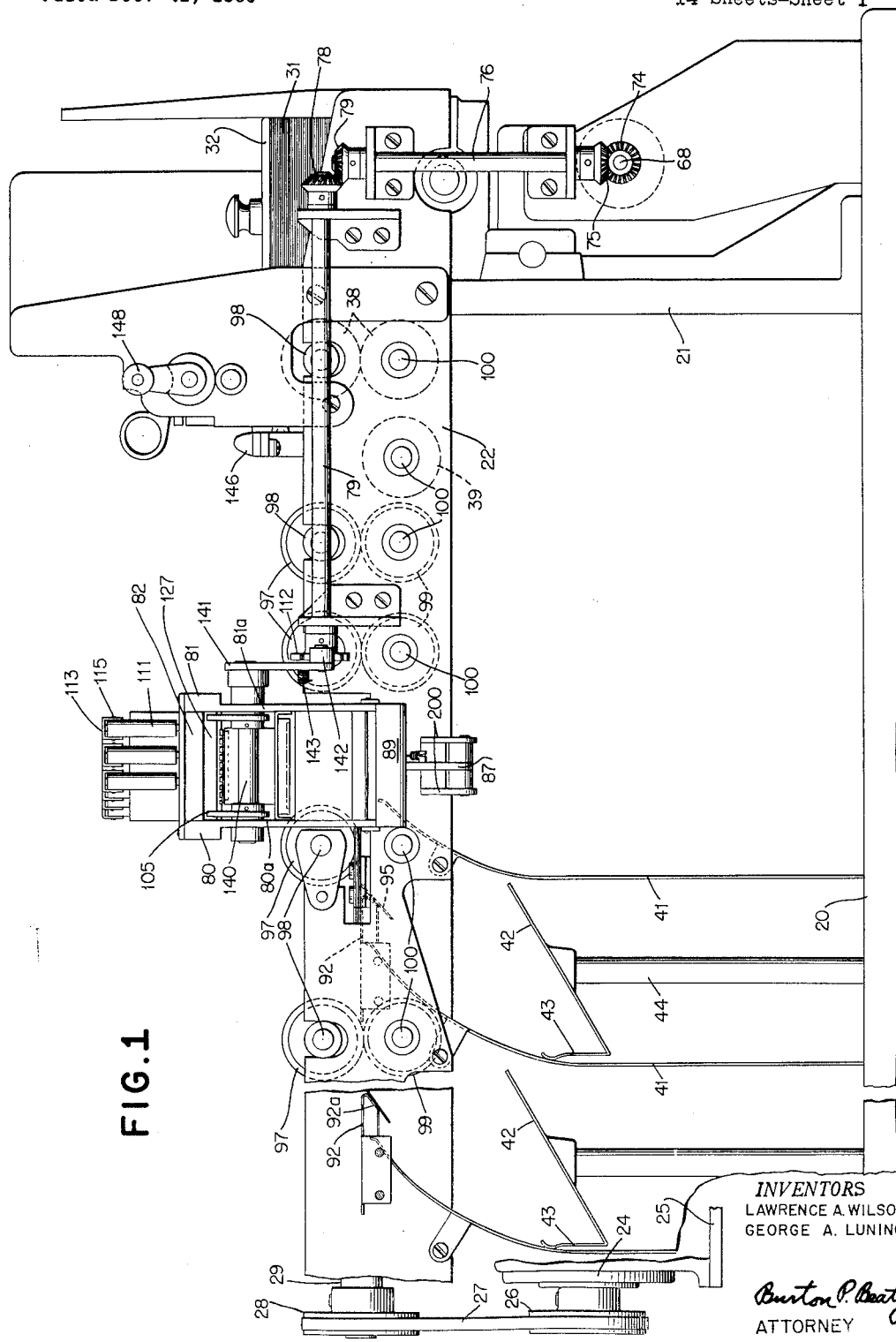
FIG. 1 is a front elevation, partly broken away, of the sorting machine.

Referring to FIG. 1, which shows a front view of the sorting machine, the frame 20 is mounted on legs (not shown). Legs 21 extend upwardly from frame 20 support side frame members 22 and 23 (FIG. 2) which house the card feeding and distributing mechanisms.

A motor 24 is supported on a subframe 25 and drives the machine by pulley 26 through belt 27 to pulley 28 secured to shaft 29 which runs the full length of the machine, in the rear, the pulley 28 being fastened on one end of shaft 29.

A stack of record cards is placed in the feed magazine as at 31 with a plate 32 on top of the stack. The machine operator by means of a handle 148 (FIG. 2) moves the contact brush 34 (FIG. 5) so that it will traverse the desired index column on the cards as they pass under it and arranges the selector switch 180 (FIG. 10a) to give the kind of sort desired. The operator then starts the machine by depressing start key 36. Card pickers 37, which are driven from shaft 29 (FIG. 6) through gearing, reciprocate horizontally and feed the cards singly from the bottom of the stack to a pair of feed rollers 38 which advance the card to the sensing station where it passes between the brush 34 and a contact roll 39. After each card leaves the sensing station, it is directed between succeeding pairs of conveyor rollers, into one of the thirteen receiving stations R, 12, X, 0, 1, 2, 3, 4, 5, 6, 7, 8, 9.

Each receiving station (FIG. 1) consists of a compartment or pocket formed by vertical walls 41, in which is an inclined tray 42 having vertical fingers 43 extending upwardly from its lower edge. The upper portion of each wall 41 is curved to provide a deflecting surface for cards which are directed against it. Each tray 42 is carried by a spring pressed plunger 44 which extends downwardly into a cylinder (not shown), wherein the plunger gradually sinks as its load of cards increases and always maintains the top of its stack at or near the top of its compartment so that newly arriving cards will have only a slight distance to drop and consequently will have no chance to turn over or become otherwise damaged.

CARD FEEDING MECHANISM

Figure 5:
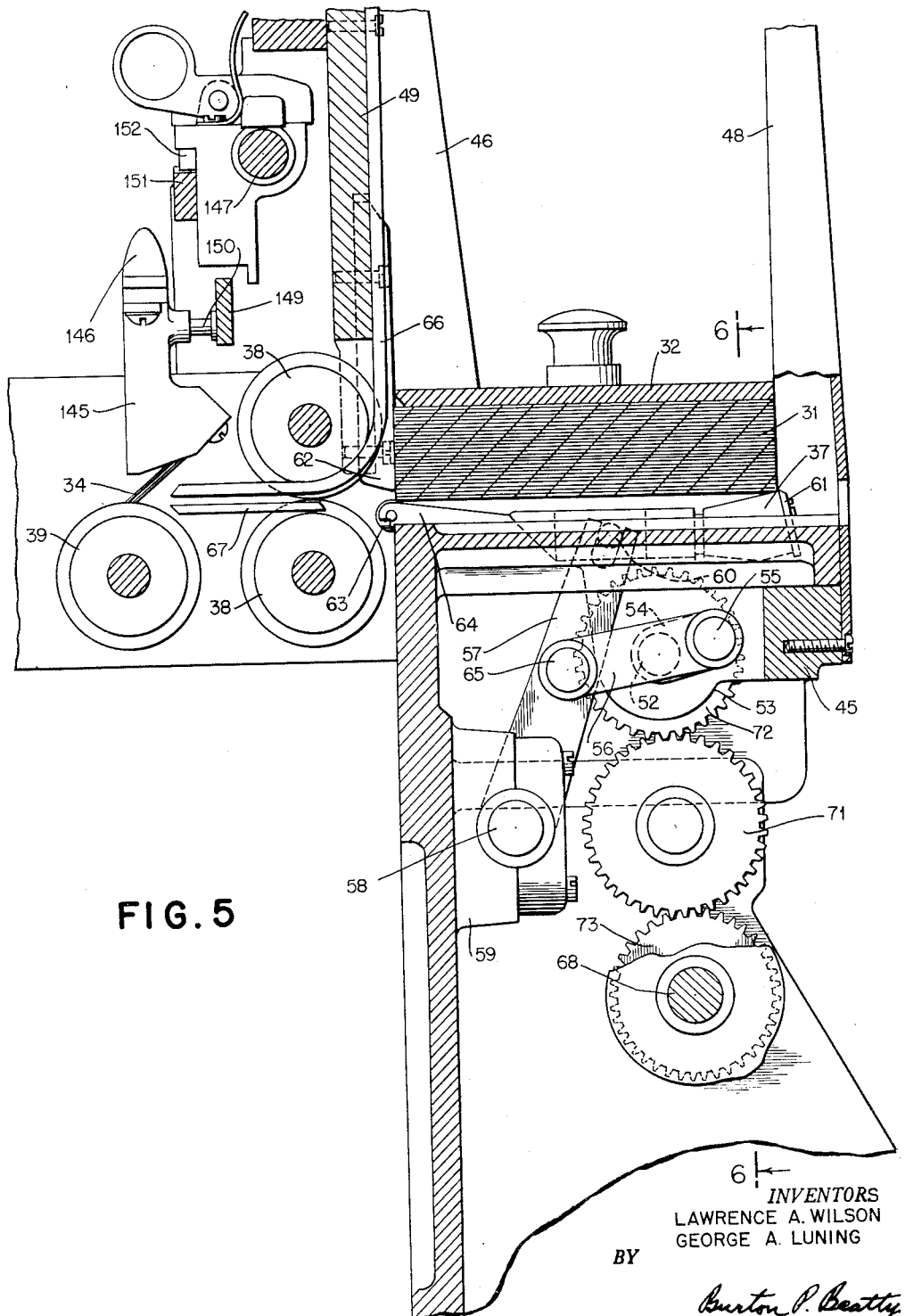
FIG. 5 is an enlarged view showing the card picker mechanism and sensing station.

The feeding mechanism shown in FIGS. 5 and 6 consists of a card magazine which is formed with a base plate 45 and side guide plates 46 and 47 (FIG. 6). Other vertical guides are provided in the form of a pair of rear card guides 48 and a front extension 49. The throat opening which allows record cards to enter the machine is located between the lower edge of the front extension 49 and base plate 45. The base plate 45 is slotted to provide two openings in which the sliding card pickers 37 reciprocate. Each opening is provided with two bearing strips which are adapted to receive a slide rib 37a extending from each side wall of the sliding pickers 37.

The pickers 37 are reciprocated on each machine cycle by means of driving connections which are geared to and synchronized with the other parts of the machine. Attached to main drive shaft 29 is a right angle worm gear 50 (FIG. 6) in mesh with a worm wheel 51 fastened to a crankshaft 52 which rides in a vertical side extension of base plate 45 and in a bearing block 53. Secured at one end to shaft 52 is a link 54 which carries an eccentric pin 55. Another link 56 is pivotally mounted on one end to pin 55, the other end of which is articulated at 65 on one of a pair of arms 57. These arms are fastened on an oscillated shaft 58 which is mounted in a pair of bearings 59 fixed to a vertical front extension of base plate 45 (FIG. 5). The upper ends of arms 57 are notched to engage wrist pins 60 pivotally mounted near the front portions of pickers 37. The bottom of each picker 37 is formed with an opening through which an arm 57 projects to engage a wrist pin 60. Upon each cycle of operation of gears 50 and 51, the eccentric pin 55 makes a complete revolution and in so doing rocks the arms 57. The pickers 37 are reciprocated by arms 57, being moved first toward the left (FIG. 5) and then back again toward the right into normal position. A blade member 61 is secured to one end of each picker 37 and projects from the picker a distance slightly less than the thickness of a card. The blades 61 separate the bottom card from the stack and push it through the roller throat assembly which consists of a knife member 62 adjustably mounted on the front extension 49 and a roller 63 carried by a plate 64 resting in a slot in the base plate 45. The throat assembly is adjusted to allow passage of only one card at a time through an opening between the edge of knife 62 and the roller 63. A pair of upper guide straps 66 are fastened to front extension 49 and extend through the throat opening to cooperate with a pair of lower guide straps 67 in directing a card to the card distributing mechanism. The card is impelled by the picker blade 61 until it is seized by the feed rollers 38.

DISTRIBUTING MECHANISM

Figure 2:
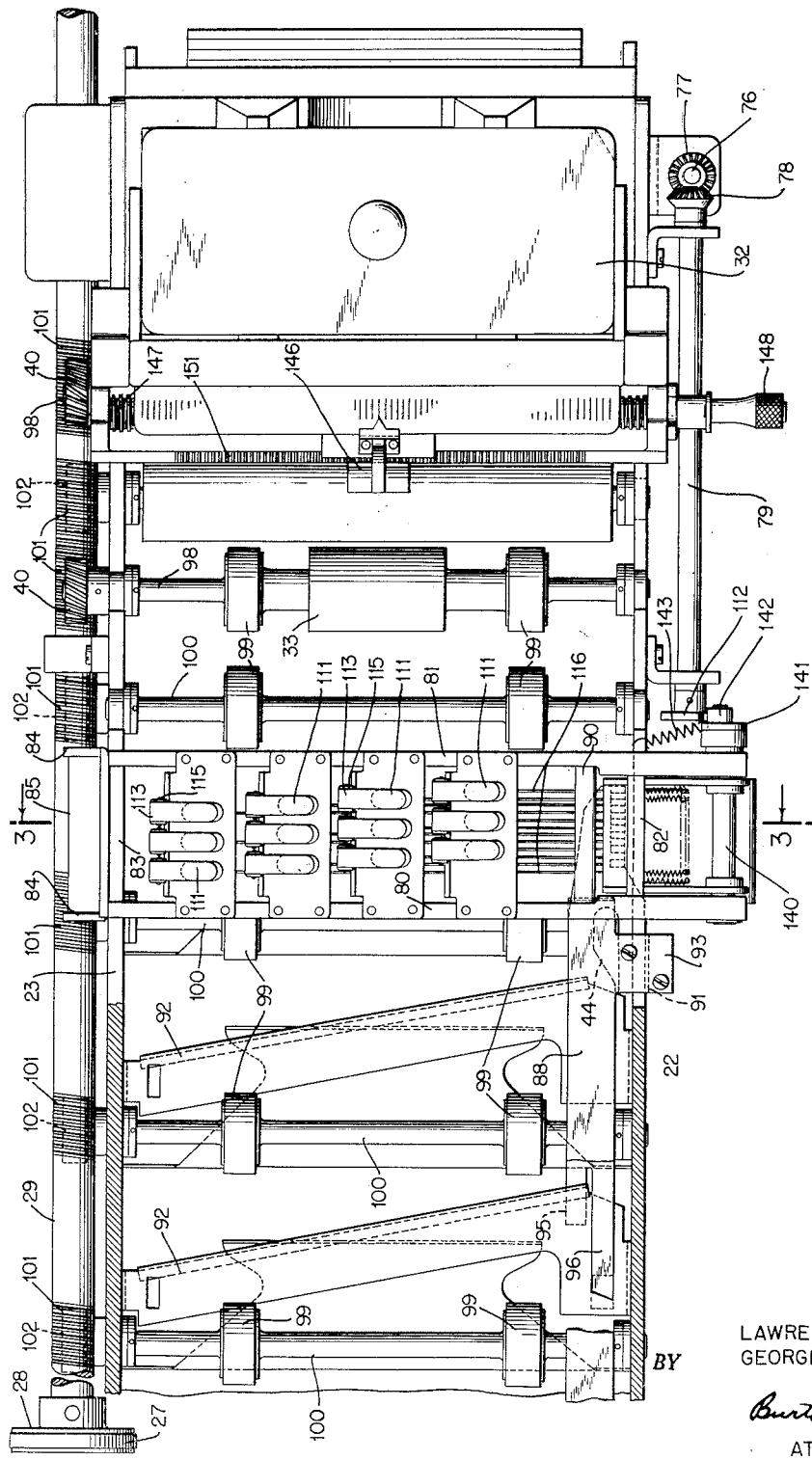
FIG. 2 is a plan view of the machine of FIG. 1.

Referring again to FIGS. 5 and 6, it is seen that a shaft 68 is mounted for rotation in machine subframes 69 and 70 and is constantly driven from a gear 72 fastened on crankshaft 52 through idler 71 and gear 73. Shaft 68 carries a number of contact operating cams which close contacts designated C1, C2, C3, etc. The timing and functioning of these cams will be set forth in connection with the explanation of the circuit diagram shown in FIGS. 10a to 10g. A bevel gear 74 is carried by shaft 68 outside subframe 69 and meshes with a bevel gear 75 secured to a vertical transfer shaft 76. The upper end of shaft 76 has a bevel gear 77 fastened thereto which is in mesh with another bevel gear 78 fixed to a horizontal shaft 79 which extends along the front of the machine (FIG. 2). Shaft 79 is thus continually driven to operate the blade selecting mechanism which will be described hereinafter.

Figure 3:
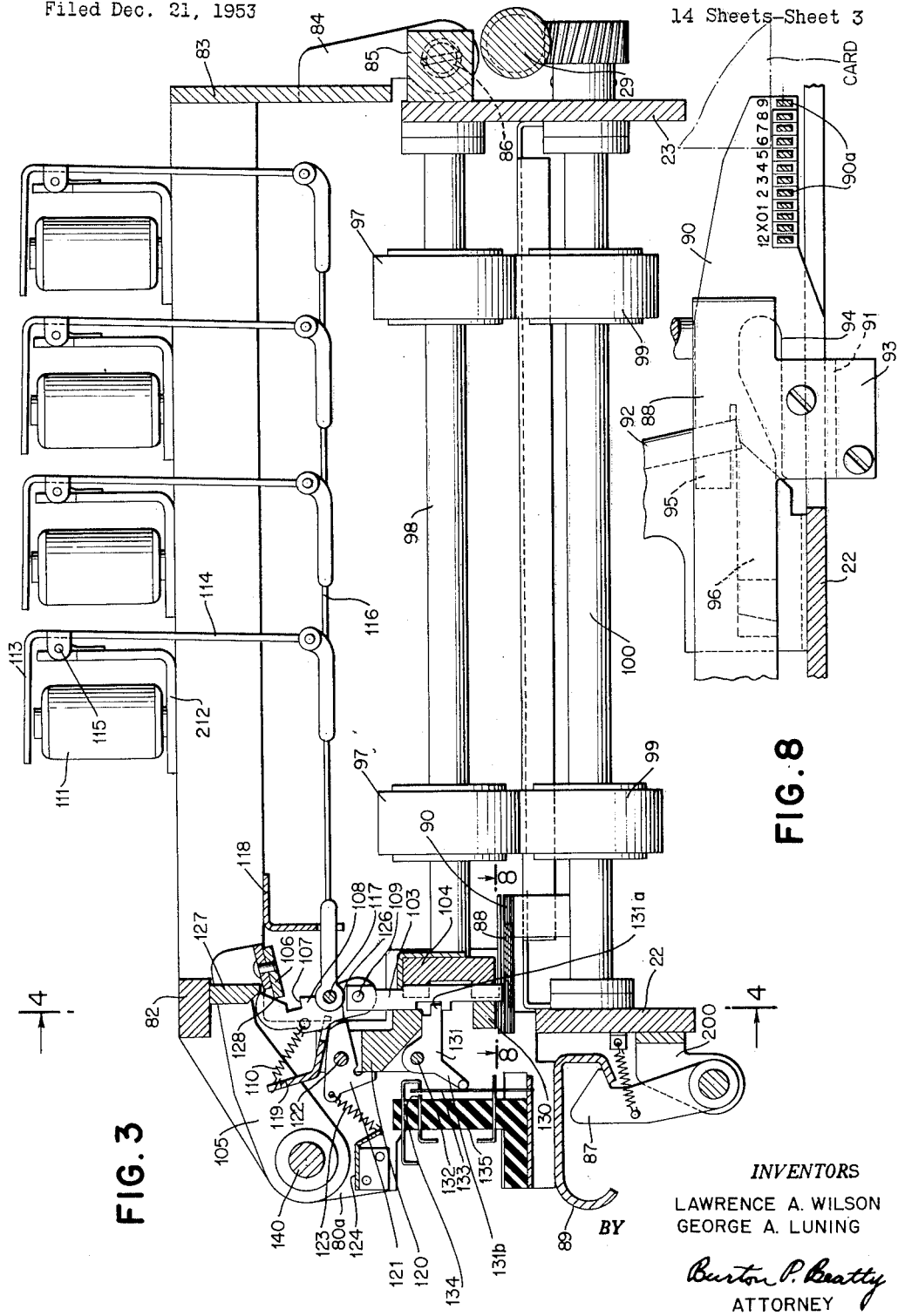
FIG. 3 is a sectional view taken along line 3—3 on FIG. 2 showing the blade selecting mechanism.
Figure 4:
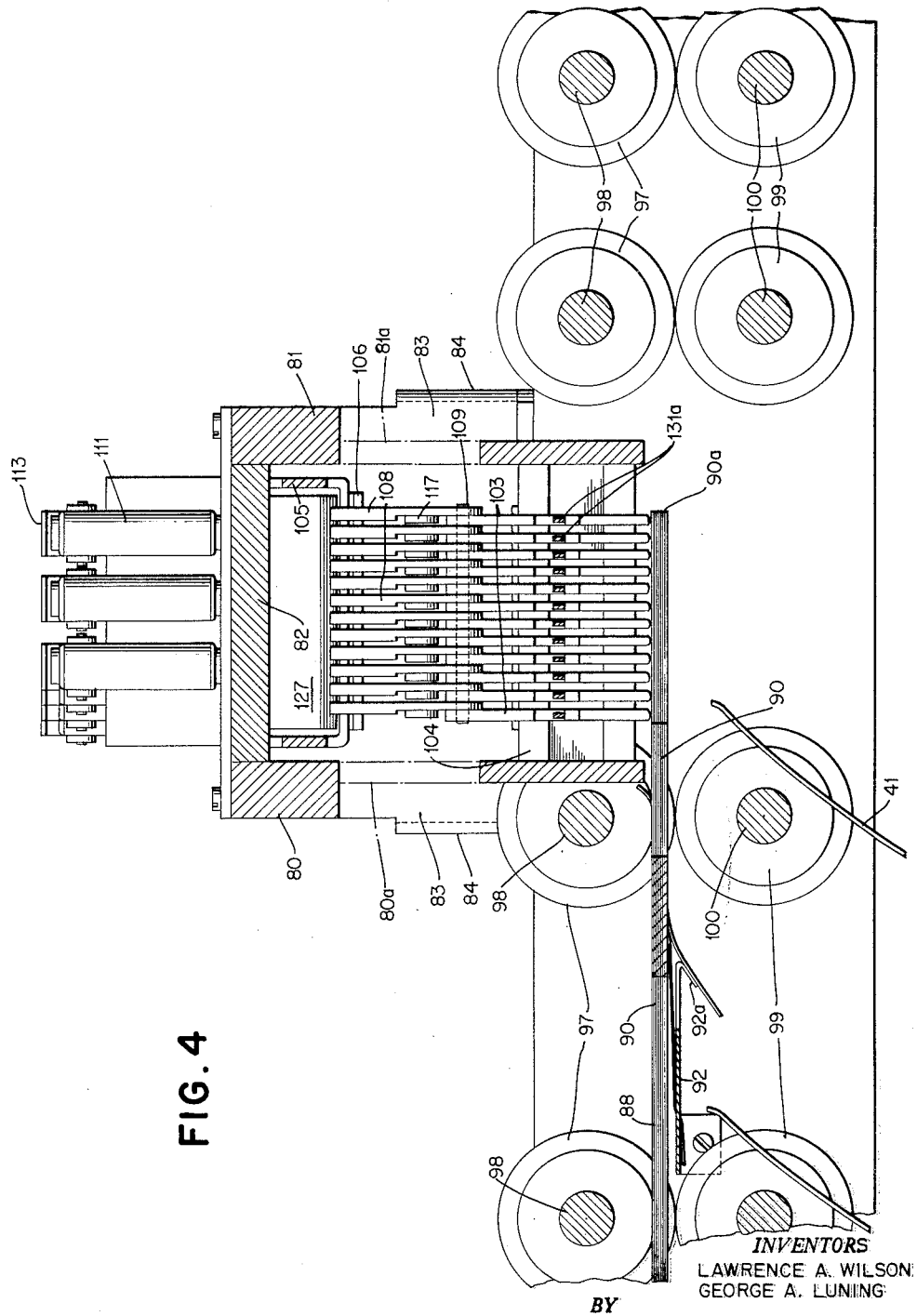
FIG. 4 is a detail sectional view taken along line 4—4 on FIG. 3.

The blade selecting mechanism is mounted in a housing shown in FIGS. 1, 2, and 4 which comprises a pair of parallel plates 80, 81 interconnected by bars 82 and 83. The plates 80 and 81 have downwardly extending portions 80a and 81a, respectively. A pair of lugs designated 84 extend downwardly from bar 83 and are adapted to fit over the end portions of a block 85 which projects outwardly from side frame 23. The lugs 84 are each provided with an opening through which a screw 86 (FIG. 3) passes to connect the lugs to the block 85. The screws 86 are not tightened to bind the lugs 84 but rather adjusted to permit the housing to be swung clockwise about screws 86, as viewed in FIG. 3, thereby making the selecting mechanism easily accessible to the machine operator. A latch 87 (FIG. 3) is pivotably mounted between a pair of lugs 200 extending from side frame 22 and is spring biased in a clockwise direction, as viewed in FIG. 3. When the housing is pivoted downwardly in the operating position, the latch 87 drops over a cooperating flange formed on a strip 89 which is secured between the portions 80a and 81a of plates 80 and 81 to hold the housing firmly in place. In order to release the housing, the operator need only to move latch 87 counterclockwise manually until the flange of strip 89 is free.

Referring now to FIGS. 1, 2, 3, and 7, it is seen that a fixed guide blade 88 and plurality of flexible blades 90 are positioned near side frame 22. These flexible blades are made of suitable resilient material to maintain themselves biased upwardly. The blades 90 are positioned with their tips 90a even with each other the 9 blade being on top and the others underneath in sequence. When the tips 90a are in their normal position, they carry enough rise to allow the cards to pass freely underneath. The receiving ends of the blades 90 are narrowed relatively to the main portions of the blades, as shown in FIGS. 2 and 8, and fastened to a bracket 91 which is supported by side frame 22. The guide blade 88 has a rigid wing portion 93 through which it is connected to bracket 91. The other blades are provided with a recessed wing portion 94 to render each blade flexible when it is fastened to bracket 91. The other or trailing ends of these blades 88 and 90 are successively attached to a series of card deflecting plates 92, one above each receiving station, the lowest blade going to station R, the second from the bottom going to station 12, the third to station X, the fourth to station 0, the fifth to station 1, and so on to station 9.

Each blade 88 and 90 is formed with tongues 95 and 96 (FIGS. 2, 7) at its trailing end, the tongue 95 extending downwardly into its respective receiving station. This tongue 95 directs the card under the front edge of plate 92 which is mounted between side frames 22 and 23 above each receiving station. Each blade tongue 96 projects into an opening located on the top of its respective plate 92 to provide that attachment between the blade and its cooperating deflecting plate. These plates actually guide the card into the receiving station. The front edge of each plate 92 is provided with a downwardly extending flange 92a which forms a forty-five degree angle with the body portion (FIG. 1). In FIG. 2 it is seen that each plate 92 is mounted so that its front edge forms an angle of approximately 10° with the leading edge of an oncoming card. The angular relationship between the plate 92 and the advancing card and the position of the plate 92 at the receiving station are critical factors which provide the desired guiding action.

In passing to the several receiving stations, the card is advanced between the successive upper and lower pairs of feed rollers which are spaced so that each set of rollers receives the card before it has passed completely from the preceding set. The upper rollers are designated 97 and secured on shafts 98, while the lower rollers are 99 and fastened on shafts 100. The lower rollers 99 are all positively driven at the same speed, the shafts 100 being driven from shaft 29 by right angle worm gears 101 meshing with worm wheels 102 secured to the ends of shafts 100. All but one of the upper rollers 97 are frictionally driven clockwise, as viewed in FIG. 1, from the lower rollers 99 which are rotated counterclockwise. In FIG. 2 an upper roller shaft 98 is shown carrying an ironing roll 33 which cooperates with a similar roll 33 (not shown) on the related lower shaft 100. This shaft 98 is positively driven from shaft 29 by worm gear 101 meshing with worm wheel 40 secured to the end of this shaft. The rollers 38 which feed the cards received from the card pickers 37 to the sensing station are mounted on similar shafts 98 and 100 which are positively driven through a worm gear 101 and worm wheel 40 and carry a pair of ironing rolls 33 (not shown). It is noted that the ironing rolls 33 are located immediately before and after the contact roll 39 to straighten each card for the sensing and feeding operations.

While the machine is sorting a promiscuous stack of cards, each card as it comes from the feeding mechanism is passed over the contact roll 39, with brush 34 bearing on the top surface of the card. If the brush finds no hole in the card, the card will pass underneath all the upwardly biased blade tips 90a, into the first receiving station designated R or "reject."

Referring again to FIGS. 1 and 2, it is seen that shaft 79 carries at one end a cam 112 which is constantly rotated thereby. A shaft 140 is mounted for oscillation in portions 80a and 81a of housing plates 80 and 81, respectively. A cam follower arm 141 is secured to shaft 140 outside plate portion 81a and carries a roller 142 which is held against cam 112 through the action of a spring 143. The contour of cam 112 is such that shaft 140 is oscillated on each machine cycle.

The selection of a blade 90 is accomplished through a row of twelve selectively operable plungers 103 (FIG. 3) which are slidably mounted in a block 104 extending between plate portions 80a and 81a and guided in their movement by a block 130. The plungers 103, as shown in FIG. 4, are positioned above the blade tips 90a so that when each plunger is lowered it engages a related blade. A sort magnet 111 is provided for each plunger to control its operation. The magnets 111 are mounted on brackets 212 extending between plates 80 and 81. Secured to the shaft 140 is a U-shaped bail 105 carrying a plunger actuating bar 106 which is adapted to cooperate with notches 107 in any of a plurality of selected interposer pawls 108. Each of the plungers 103 has a corresponding interposer pawl 108 which is pivotably connected thereto by a pin 109. Normally the pawls 108 are held out of the path of the bar 106, and the plungers 103 are held above their related blade 90 by a spring 110 attached to each pawl. However, when a magnet 111 is energized, the associated pawl 108 is drawn into cooperation with bail 106, and the related plunger is actuated to depress the raised tip 90a of a blade 90 below the card line.

In FIG. 3 it is seen that the armature 113 of each plunger controlling magnet 111 is mounted on a lever 114 pivoted at 115. The lower end of lever 114 is pivotably connected to a call wire 116, the other end of which is pivoted at 117 on pawl 108. A plurality of such connections are made, one to each pawl, the magnets 111 being arranged in staggered rows and columns.

When attracted, the armature 113 swings the lever 114 in a counterclockwise direction, as viewed in FIG. 3, and draws the wire 116 to the right, urging pawl 108 into cooperation with bail bar. The wires 116 are guided by a slotted plate 118, and the pawls 108 are aligned by slots in a plate 119 fastened on a supporting bar 120, the plate being used also to secure on end of springs 110. A camming member 121 is provided for each pawl and is pivoted on bar 120 at 122. A spring 123 connects each camming member 121 to a bracket 124 and continually urges its related member counterclockwise. The camming members cooperate with a cam face 126 on each pawl 108 to hold the selected pawls into cooperation with bail bar as the bail is lowered.

The controlling magnet 111 is energized throughout the blade selecting operation, as shown in FIG. 9, wherein the plunger 103 is lowered and raised again and will maintain the pawl 108 in engagement with the bail bar. Since the machine of this invention is operated at high speed, the camming member 121 is utilized to insure against the possibility of pawl 108 being jarred out of engagement with bar 106.

An extension 127 depending from plate 82 cooperates with the upper ends of pawls 108 to cam them in a counterclockwise direction (FIG. 3) out of engagement with the ascending bar 106 on the return stroke of this bail. This device is also for purposes of safety when operating at high speed and in the event that the normal restoring spring 110 of pawl 108 does not promptly disengage the pawl or if any residual magnetism is present in magnet 111 tending to retard the restoration. In order to positively hold the pawls 108 in disengaged position, the end of bail 106 cooperates with a cam face 128 on each pawl. A contact operating lever 131 is provided for each plunger 103. These levers are pivotally mounted on a rod 132 and have front extensions 131a which project into depressions formed in the sides of plungers 103. Each lever 131 is formed with a contact operating arm 131b which is constantly engaged by a resilient wire 133. When plunger 103 moves downwardly, lever 131 is cammed in a clockwise direction (FIG. 3), and arm 131b pushes wire 133 to the left to transfer checking contacts 134 embedded in an insulating block 135. The transfer of these contacts is compared with the energization of the sort magnet 111 which will be explained in detail hereinafter in connection with the circuit diagram.

It is thus apparent that if brush 34 finds a hole in a card, it will complete an electric circuit by making contact with the roll 39, thereby energizing a magnet 111. The related armature will be drawn down (FIG. 3) to pull an interposer pawl 108 into cooperative relationship with bar 106. From the timing chart of FIG. 9, it is seen that at 247½° of a machine cycle the cam 112 moves bar 106 downwardly, the bail striking pawl 108 at 315° to depress plunger 103 which is held down until 180° of the next following cycle. The bail 106 starts to restore at 180° and continues until 260° of the same cycle where it is fully restored. At 260° all twelve index positions have been read by brush 34 to complete the energization of the proper magnet 111 to depress the related blade tip 90a and all the blade tips beneath it as shown in FIG. 7. The card is then directed into the passage between the fifth and sixth blade (counting from the top), and the card as it passes between the successive pairs of rollers will be confined to that particular passage which ends in station 4. The cards are fed bottom first, and the brush passes over the index positions in any column in the order 9, 8, 7, 6, 5, 4, 3, 2, 1, 0 followed by the extra positions X and 12.

BRUSH MECHANISM

Brush 34 is secured in a brush holder 145 (FIG. 5) and insulated from a carrier 146 which is adapted to be adjusted by means of a screw shaft 147 extending crosswise of the machine and capable of being turned manually by means of a handle 148 (FIG. 2), so as to bring the brush 34 into a position to sweep over or sense any desired column of a card. Rigidly fastened to side frames 22 and 23 directly in front of the brush supporting mechanism is a dentated plate 151 with whose teeth a tooth 152 formed on the brush support co-acts to hold the support in any analyzing position to which it is moved. The brush 34 is electrically connected to an insulated contact rail 149 extending beneath and parallel with the shaft 147, crosswise of the machine, a suitable spring actuated contact plunger 150 providing means for maintaining the circuit to the brush 34 regardless of the column on the card with which the brush has been brought into cooperative relation.

The carrier 146 and the means for adjusting it to a desired column do not form any part of the present invention and have been only briefly mentioned herein. For a more detailed description, reference may be had to U.S. Patent No. 1,741,992, issued December 31, 1929, to H. Klecker.

THE CARD CODE

An example of a specific code which can be employed herein is shown below where the alphabetic characters, numeric digits, and other symbols selected by perforations appearing in a column, singly or in combination, are illustrated. For a detailed description of this type of code, reference can be made to U.S. Patent No. 2,438,071, issued March 16, 1948, to R. E. Page et al. It should be understood that other codes can be devised to function with the sorting system utilized in this invention.

| Pilot Holes | 0 | X | 12 | N Pulse | Digits |
|---|---|---|---|---|---|
| Card Holes: | | | | | |
| 1 | / | J | A |  | 1 |
| 2 | S | K | B |  | 2 |
| 3 | T | L | C |  | 3 |
| 4 | U | M | D |  | 4 |
| 5 | V | N | E |  | 5 |
| 6 | W | O | F |  | 6 |
| 7 | X | P | G |  | 7 |
| 8 | Y | Q | H |  | 8 |
| 9 | Z | R | I |  | 9 |
| 0 |  | Through | Zero | Control | 0 |
| 8–3 |  | $ | . | # |  |
| 8–4 | % | * | ◇ | @ |  |
| N Pulse |  | & | – |  |  | cards containing punches representing the remaining letters will be conducted in part to the X pocket and in part to the 12 pocket, a partial sort being made during the first run wherein these cards are divided into two groups for return to the machine. The purpose of the two groups is to get the B, D, F, H, J, M, P, S, V, and Y cards in front of the K, N, Q, T, W, and Z cards in one pass.

The machine is then conditioned for the second pass. The next step in the sorting operation is to place the cards from the X pocket in the feed stack above the cards from the 12 pocket. The cards are then passed through the machine a second time and will be contained in the pockets of the machine as illustrated below:

| Pocket | 9 | 8 | 7 | 6 | 5 | 4 | 3 | 2 | 1 | 0 | X | 12 | R |
|---|---|---|---|---|---|---|---|---|---|---|---|---|---|
| Cards | ZYX | WVU | TSR | QPO | NML | KJI | HG | FE | DC | BA |  |  | Numeric Digits. Symbols, Rejects. |

THE SORTING SYSTEM

The term "partial sorting" as used herein means the performance of sorting operations upon a group of cards which results in the distribution or division of these cards into more than one card-receiving pocket. The term "specific sorting" applies to the individual distribution of each card to one, and only one, pocket which is designed for reception thereof.

Referring now to FIG. 7 wherein the various receiving stations or pockets are diagrammatically illustrated, it will be seen that the machine is equipped with thirteen such pockets. These pockets have been labeled 9, 8, 7, 6, 5, 4, 3, 2, 1, 0, X, 12, and R. In the operation of the machine, if numerical sorting is to be effected, the machine may be conditioned in a manner subsequently to be described, so that if a group of cards is run through the machine, each numerically punched card will be sorted into the pockets, as diagrammatically illustrated below:

| Pocket | 9 | 8 | 7 | 6 | 5 | 4 | 3 | 2 | 1 | 0 | X | 12 | R |
|---|---|---|---|---|---|---|---|---|---|---|---|---|---|
| Cards | 9 | 8 | 7 | 6 | 5 | 4 | 3 | 2 | 1 | 0 | KNQTWZ | BDFHJ MPSVY | ACEGILORUX. Symbols—Rejects. |

Symbols and alphabetic characters are represented by a combination of punches in one or more numeric index point positions and in the X or 12 positions. Cards which are thus punched are directed to pockets X, 12 and R, respectively, as shown above.

Where alphabetical sorting is concerned, the machine is conditioned so that after the first pass of the cards through the machine, they will be sorted into various pockets as indicated below:

| Pockets | 9 | 8 | 7 | 6 | 5 | 4 | 3 | 2 | 1 | 0 | X | 12 | R |
|---|---|---|---|---|---|---|---|---|---|---|---|---|---|
| Cards | X | U | R | O | L | I | G | E | C | A | KNQ TWZ | BDFHJ MPSVY | Numeric Digits. Symbols, Rejects. |

From the above chart, it will be seen that during this first run of the cards any numerical cards in the stack will be conducted into the reject or R pocket. Also, any blank cards or cards which are not punched in the localized region thereof undergoing sensing will be rejected or, in other words, conducted to the R pocket. It is noted that the cards which are sorted in pockets 0–9 are ones which are punched to represent all the vowels and certain more frequent consonants. The unsorted During this second pass through the machine, the B's fall on the A's in the 0 pocket, the D's fall on the C's in the 1 pocket, etc., to complete an alphabetic sort without stripping the 0–9 pockets of the machine between the first pass and the second pass.

The cards are finally removed from the pockets sequentially, and when properly stacked, they will be found to be in correct alphabetical order.

When the stack of cards to be sorted includes only alphabetic characters and numeric digits and it is known that there is a predominance of numeric digits, the machine is conditioned as for a numeric sort. On the first pass of the cards through the machine, the numeric digits are sorted as shown previously in the diagrammatic illustration of numeric sorting and the alphabetic characters are directed to the X, 12, and reject pockets. It is noted that the alphabetic characters which are grouped in the reject pocket are punched to represent all the vowels and certain more frequent consonants. This pass classifies the characters in the reject pocket in front of the groups in the 12 and X pockets.

The next step is to remove the cards having numeric digits from the 0–9 pockets and the cards having alphabetic characters from the reject, 12, and X pockets sequentially and condition the machine as for the second pass in straight alphabetical sorting. The alphabetic cards are then passed through the machine a second time and will be contained in the pockets of the machine as shown previously in the diagrammatic illustration of alphabetical sorting.

In the case where cards punched with symbol designations are included in the stack, on a numerical sort they are directed to the reject pocket. On an alphabetical or alpha-numerical sort, the symbol cards are directed to the reject pocket on the second pass where they can be readily separated from the remainder of the stack. The machine is then conditioned for a sort of the symbol cards. The cards are passed through the machine, and they will be sorted into the various pockets as indicated below:

| Pocket | 9 | 8 | 7 | 6 | 5 | 4 | 3 | 2 | 1 | 0 | X | 12 | R |
|---|---|---|---|---|---|---|---|---|---|---|---|---|---|
| Cards | @ | # | % | , | / | - | * | $ | & | ◇ | . | Alphabetic | Numeric Digits and Rejects. |

Another feature of the sorting system of this invention is the provision of a so-called length of field sort for alphabetic characters. A sensing brush block having a row of brushes 35 (FIG. 10f) is positioned on the right hand eight columns of the name field. In an eight column name or less the cards are directed to the 0–8 pockets according to the number of columns punched in the field to represent a particular name. For a name using more than eight columns, a repetition of this procedure is required by moving the block over the next eight columns to the left. The cards are passed through the machine a single time for each position of the brush block and they will be sorted into the various pockets as indicated below:

| Pocket | 9 | 8 | 7 | 6 | 5 | 4 | 3 | 2 | 1 | 0 | X | 12 | R |
|---|---|---|---|---|---|---|---|---|---|---|---|---|---|
| Cards | | 8 columns or more. | 7 | 6 | 5 | 4 | 3 | 2 | 1 | Less than 1. | | | |

From the above chart, it will be seen that after the single pass in this sort, the name field is sorted to include in each column of sort only those cards that are punched in that column. The cards which do not have a punch in the name field are directed to the 0 pocket.

CIRCUIT DESCRIPTION AND MACHINE OPERATION

Figure 10B:
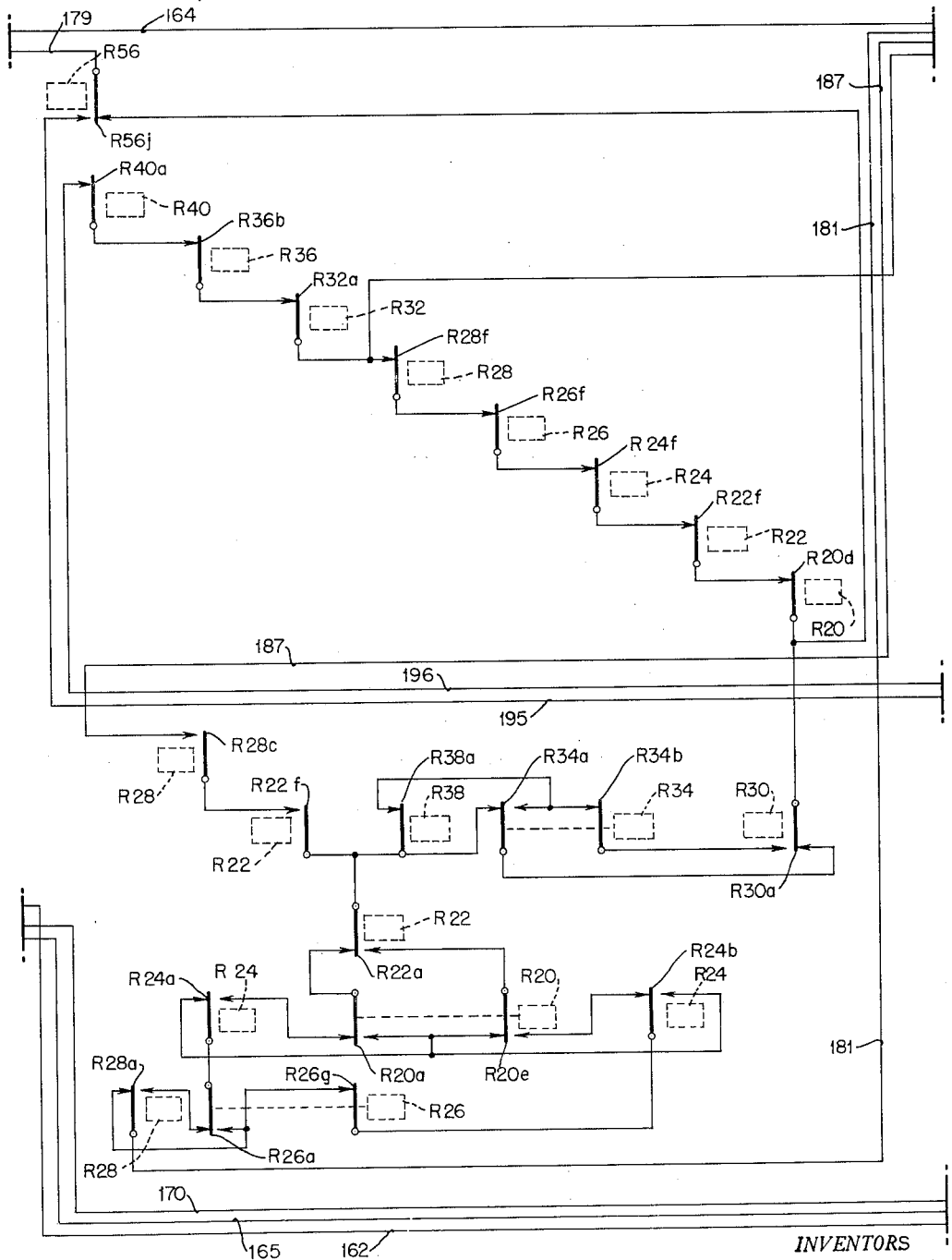
Figure 10C:
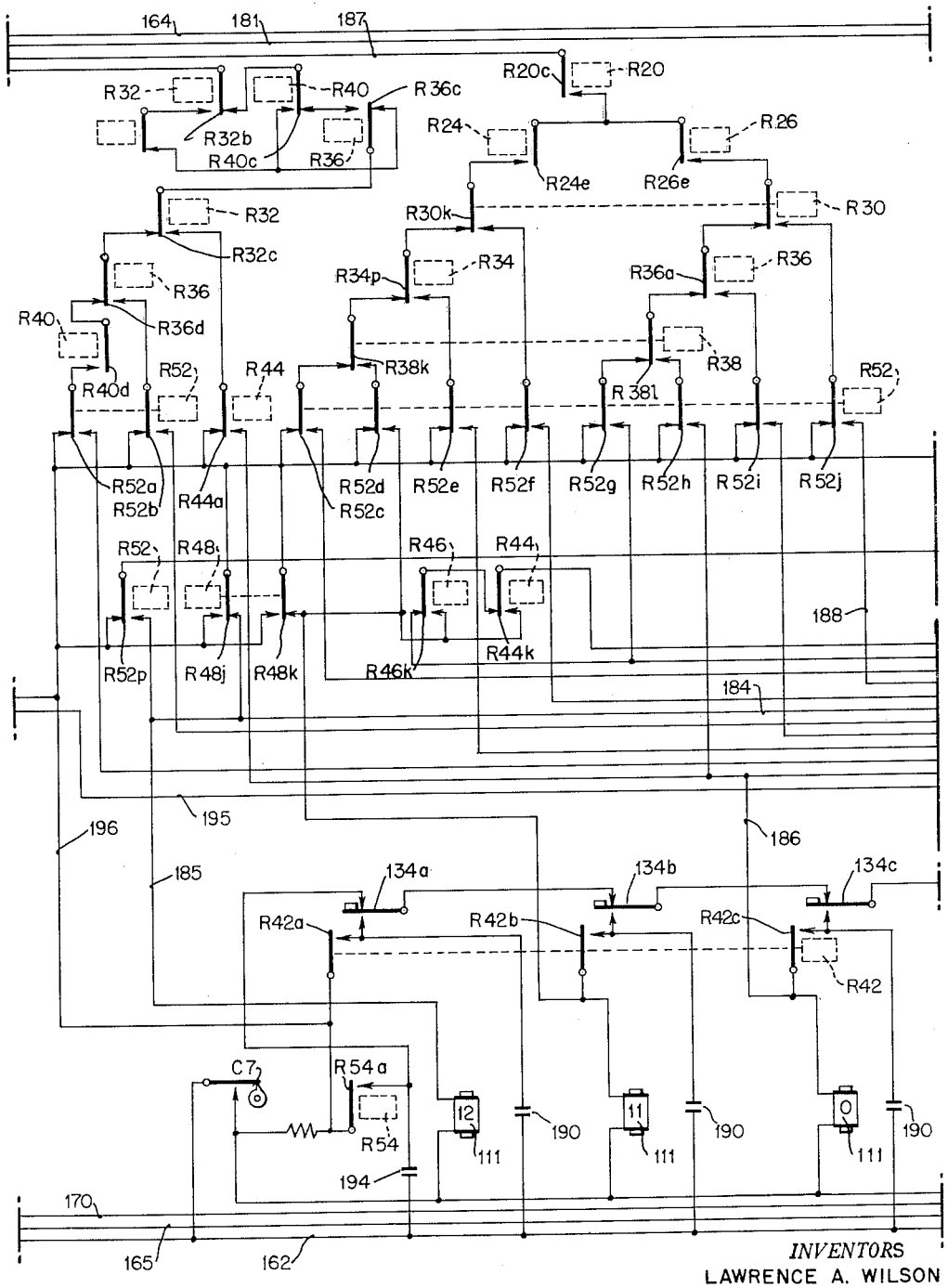
Figure 10D:
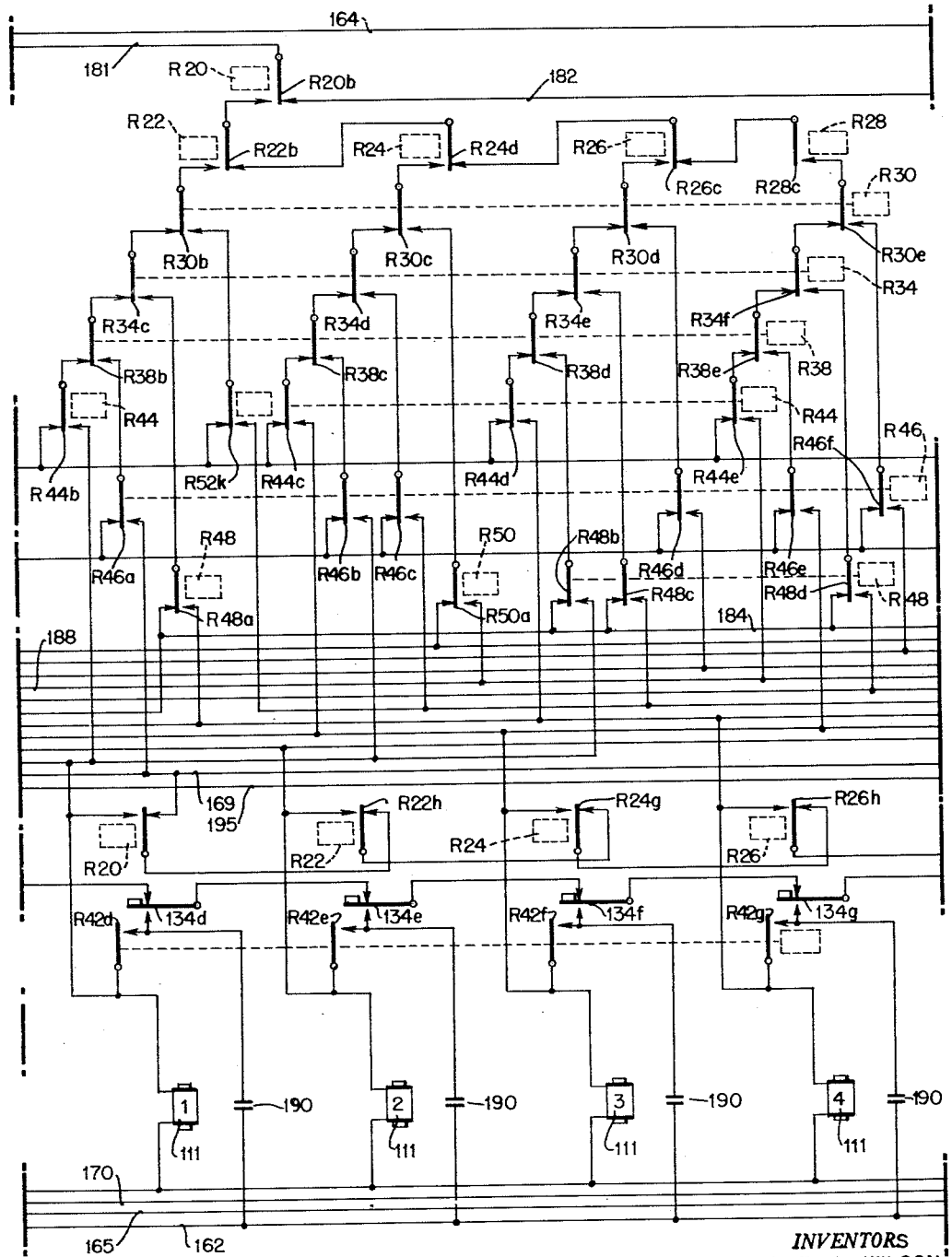
Figure 10E:
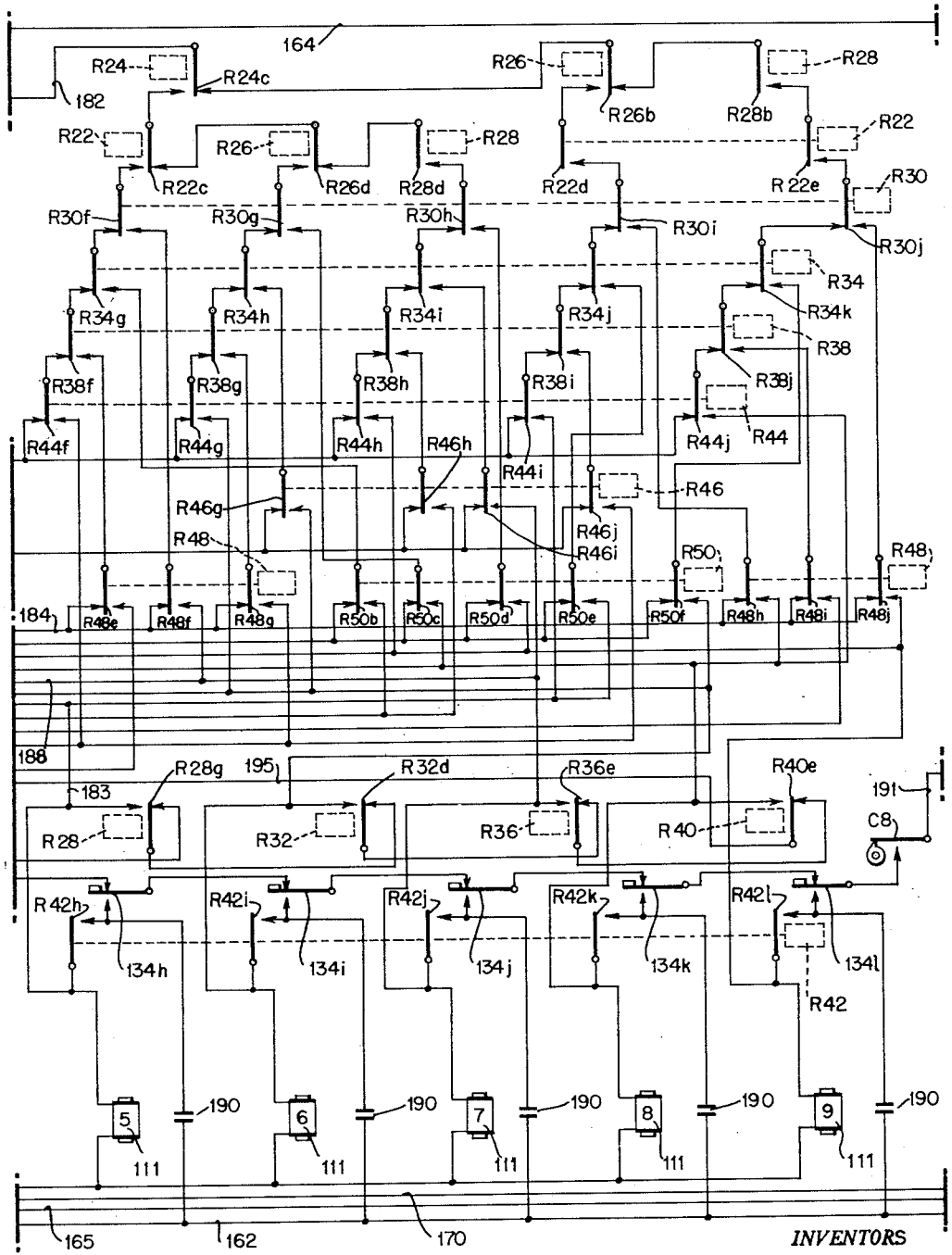

Referring now to FIGS. 10a to 10g wherein the electrical diagram for the machine is shown, a source of current supply is shown at S in FIG. 10a and is adapted to supply current to the sorter motor M. Power from the source is made available for machine operations by means of a master switch MS. After the master switch MS has been closed, an interval of time must be allowed to heat the cathodes of the various electronic tubes included in the circuit. For this purpose thermal contacts 160 are incorporated in the circuit.

The voltages supplied by the source S are shown in FIG. 10a where lines 162, 163, 164, and 165 are at 0, +45, +55 and —48 volts, respectively. Also a line 170 provides 6.3 volts A.C. to the filaments of all the electronic tubes. These voltage values are given only by way of example. It is to be understood that any suitable voltage values may be employed. The line 163 is connected to the coil 161 of the thermay contacts 160 through relay contacts R10a (normal), the other side of coil 161 being connected to the 0 volt line 162. The heating of coil 161 will cause the thermal contacts 160 to close and pick up the thermal relay R10 as follows: From line 163, through thermal contacts 160 (now closed), relay R10 to line 162. The relay contacts R10a will then transfer to break the circuit to the coil 161 and establish a holding circuit for relay R10 as follows: From line 163, through contacts R10a (transferred), relay R10 to line 162. This circuit will be maintained as long as the switch MS remains closed. The normally open relay contacts R10b also close to provide a positive potential from the source S to the machine starting and running circuits. In order to start the machine the relay contacts R12a and R12b must be closed as described hereinafter in connection with the checking circuit.

To start the machine in operation, the operator depresses the start key 36 which upon closure of its contacts establishes a circuit to the motor start control relay R14 as follows: From line 163, through relay contacts R10b (now closed), start key contacts, b contacts of relay R12 (now closed), coil of relay R14 to line 162. Energization of relay R14 closes its "a" contacts to establish a circuit to the motor relay R16 as follows: From line 163, through relay contacts R10b, contacts R14a, coil of motor relay R16 to line 162. Energization of motor relay R16 closes its "a" contacts in the motor circuit causing the motor M to start running. The energization of motor M causes the feeding of cards so that card lever CL closes its contacts CLa to cause the energization of card lever relay R18 through the following circuit: From line 163, through contacts CLa, coil of relay R18 to line 162. The relay contacts R18a then close to establish a holding circuit for relay R18 through cam contacts C9 which are now closed. The timing of cam contacts C1 through C10 is shown in FIG. 9. The energization of relay R18 closes its "b" contacts to provide a holding circuit for the motor control relay R14 as follows: From line 163, through relay contacts R10b, relay contacts R18b, pocket stop contacts 167 (normally closed), contacts of stop key 168, relay contacts R14b (now closed), relay contacts R12b (now closed), coil of relay R14 to line 162. A resistor 197 is connected in series with a condenser 198 and a resistor 199 which are in parallel. The resistors 197 and 199 provide a voltage drop between lines 163 and 162 when these lines are connected. Once the holding circuit for relay R14 is established, start key 36 may be relinquished, for now the machine will continue to run until the cards in the magazine are exhausted or until at least one of the pockets becomes filled to open pocket stop contacts 167 or until the stop key 168 is depressed to open its contacts. When the last card passes the card lever CL, the contacts CLa will open and relay R18 will be deenergized at the end of the card reading time upon the opening of cam contacts C9 (FIG. 9). The deenergization of relay R18 causes the holding circuit for relay R14 to break and drop out relay R14.

ELECTRONIC TUBE CIRCUITS

As previously indicated, the machine has associated therewith a plurality of electronic tube controlled relay circuits. In FIG. 10g there is shown a series of nine electronic tubes labeled T1, T2, T3, T4, T5, T6, T7, T8, and T9. These tubes are of the thyratron type, each having a screen grid and a control grid. Tubes T1 to T8 have disposed in their anode circuits respective pick-up relay magnets R20, R22, R24, R26, R28, R30, R32, R34, R36, R38, and R40. The anode circuits are under control of cam contacts C1. The relay R12 is disposed in the anode circuit of tube T9 which is under control of cam contacts C10.

Figure 10F:
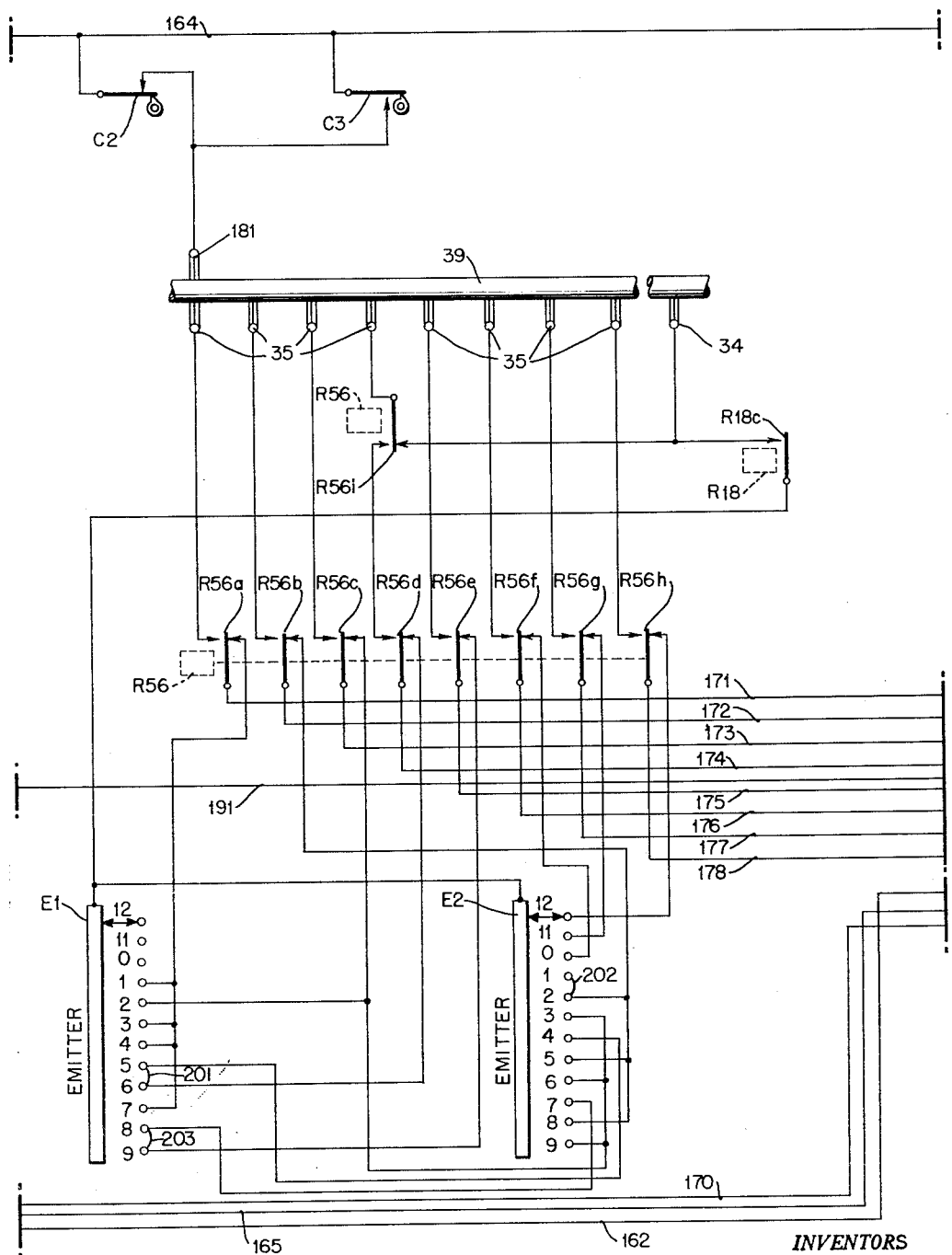

When the master switch MS is closed, a circuit is completed from the line 170 through the filaments of tubes T1 to T9 to line 162. The control grids of each tube T1 to T8 have a substantially fixed voltage applied thereto from lines 164 and 165. Each tube becomes coductive when the appropriate voltage is applied to its anode and at the same time its screen grid is brought to zero or a positive potential. A conductive tube will continue to conduct until the anode or plate circuit is broken. Lines 171 through 178 extend from emitters E1 and E2, as shown in FIG. 10f, to the screen grids of tubes T1 to T8.

As the following description progresses, the specific tube circuits will not be followed in detail, it being understood that upon each thyratron tube becoming conductive, its respective pick-up relay or relays in the plate circuit will become energized.

NUMERICAL SORTING

For the sorting of a single numerical character, the sort selection switch 180 (FIG. 10a) is moved to the N position and a circuit is completed from line 163 through the N position of switch 180 and the coil of a relay R44 to line 162. The energization of relay R44 closes its contacts R44a through R44K (see FIGS. 10c, 10d, 10e) to condition the circuits for energization of the proper sort magnet 111.

In the sorting scheme of this invention each numerical digit is represented by two of the aforementioned thyratron tubes T1 to T5 as diagrammatically illustrated below:

*Tube and relay coding chart*

|  | Tubes | Relays |
|---|---|---|
| Digit Index Position: | | |
| 1 | T1—T2 | R20—R22 |
| 2 | T2—T3 | R22—R24 |
| 3 | T1—T3 | R20—R24 |
| 4 | T1—T4 | R20—R26 |
| 5 | T2—T4 | R22—R26 |
| 6 | T3—T4 | R24—R26 |
| 7 | T1—T5 | R20—R28 |
| 8 | T2—T5 | R22—R28 |
| 9 | T3—T5 | R24—R28 |
| Zone Index Position: | | |
| 12 | T8 | R38—R40 |
| X | T7 | R34—R36 |
| 0 | T6 | R30—R32 |

It is noted that the zone positions are each represented by a single tube T6 to T8 which each have two relays associated therewith.

The circuit arrangement includes a pair of emitters designated E1 and E2. Each emitter is correlated in its movement with the movements of the cards through the machine and includes a brush which is designed to traverse a series of contact points associated with the various output circuit wires leading to the code tubes T1 to T8.

From the above code chart, it will be seen that the sensing of a perforation in the 5 index position, for example, of a card column being sorted results in tubes T2 and T4 becoming conductive through the following circuit: From line 164 (FIG. 10f), through cam contacts C2 (now closed), common brush 181, contact roll 39, contact brush 34, relay contacts R18c (now closed), common bars of emitters E1 and E2; from 5 contact of E1, jumper 201, contacts R56d (normal), wire 174, to the screen grid of tube T4; and in parallel with the path from E1, from 5 contact of E2, contacts R56b (normal), wire 172 to the screen grid of tube T2. The firing of tubes T2 and T4 energizes relays R22 and R26, respectively, by means of a circuit from line 164 through cam contacts C1 which are closed during the sensing of the card index positions by contact brush 34 (FIG. 9). These relays close contacts which provide a circuit to the 5 sort magnet 111 (FIG. 10e) when cam contacts C6 close at 270° of the machine cycle as follows: From line 163, cam contacts C6 (FIG. 10a), wire 179 (FIG. 10b), relay contacts R56j (normal), contacts R30a (normal), contacts R34a (normal), contacts R22a (transferred), contacts R20e (normal), contacts R24a (normal), contacts R26a (transferred), contacts R28a (normal), wire 181 (FIGS. 10c, 10d), relay contacts R20b (normal), wire 182 (FIG. 10e), relay contacts R24c (normal), contacts R26b (transferred), contacts R22d (transferred), contacts R30i (normal), contacts R34j (normal), contacts R38i (normal), contacts R44i (transferred), wire 183, the 5 sort magnet 111, cam contacts C7 (FIG. 10c) to line 162. Energization of this 5 sort magnet causes its related interposer pawl 108 (FIG. 3) to move against bar 106 for selection of the proper distributing blade 90, as explained hereinbefore in connection with the mechanical description.

It should be noted from the timing chart (FIG. 9) that the card which is being read has not yet entered between the blades 90 at 26° of the following machine cycle and after all index positions have been read, the card enters the distributing blades and is directed to its assigned pocket.

ALPHABETIC SORTING

FIRST SORT

For sorting characters of an alphabetical designation, the sort selection switch 180 (FIG. 10a) is moved to the A1 position and a circuit is completed from line 163 through the coil of relay R46 to line 162. The energization of relay R46 closes its contacts R46a through R46k (see FIGS. 10c, 10d, 10e).

Referring to the card code chart shown above it is seen that the alphabetic character A, for example, is represented by a perforation in the 12 zone position and 1 index point position. Since the card is fed with the 9 edge first, the 1 index point position is read before the zone perforation. From the tube diagram previously shown, it will be seen that the sensing of a perforation in the 1 index position of a card column being sorted results in tubes T1 and T2 becoming conductive through the following circuit: From line 164 (FIG. 10f), through cam contacts C2 (now closed), common brush 181, contact roll 39, contact brush 34, relay contacts R18c (transferred), common bars of emitters E1 and E2; from 1 contact of E1, contacts R56a (normal), wire 171 to the screen grid of tube T1; and in parallel with the path from E1, from 1 contact of E2, through jumper 202, contacts R56b (normal), wire 172 to the screen grid of tube T2. The firing to tubes T1 and T2 energizes relays R20 and R22, respectively, by means of a circuit through cam contacts C1. The sensing of the perforation in the 12 zone position results in the firing of tube T8 through the following circuit: From line 164 (FIG. 10f), through cam contacts C3 (now closed), common brush 181, contact roll 39, contact brush 34, relay contacts R18c (transferred), common bar of emitter E2, 12 contact of E2, contacts R56h (normal), wire 178 to the screen grid of T8. The firing of this tube energizes relays R38 and R40. The energized relays R20, R22, R38, and R40 close contacts which upon closure of cam contacts C6 provide a circuit to the 0 sort magnet (FIG. 10c) as follows: From line 163, cam contacts C6 (FIG. 10a), wire 179 (FIG. 10b), relay contacts R56j (normal), contacts R30a (normal), contacts R34a (normal), contacts R22a (transferred), contacts R20e (transferred), contacts R24b (normal), contacts R26g (normal), contacts R28a (normal), wire 181 (FIGS. 10c, 10d), contacts R20b (transferred), contacts R22b (transferred), contacts R30b (normal), contacts R34c (normal), contacts R38b (transferred), contacts R46a (transferred), wires 169 and 186 (FIGS. 10d, 10c) to the 0 sort magnet 111, cam contacts C7 to line 162. Energization of this sort magnet causes selection of the proper distributing blade 90 to send the A card to its assigned pocket. It should be noted that the A card is completely sorted on a single pass through the machine. Reference to the card chart for alphabetic sorting shows that cards punched with the characters C, E, G, I, L, O, R, U, and X are also specifically sorted on this first pass. The cards punched with the remaining alphabetic characters are grouped in the 12 and X pockets.

Again referring to the card code chart, it is seen that the alphabetic character B, for example, is represented by a perforation in the 12 zone position and 2 index point position. From the tube code diagram it will be seen that the sensing of a perforation in the 2 index position of a card column being sorted results in tubes T2 and T3 becoming conductive through the following circuit: From line 164 (FIG. 10f), through cam contacts C3 (now closed), common brush 181, contact roll 39, contact brush 34, relay contacts R18c (transferred), common bars of emitters E1 and E2; from 2 contact of E1, contacts R56c (normal), wire 173 to the screen grid of tube T3; and in parallel with the path from E1, from 2 contact of E2, contacts R56b (normal), wire 172 to the screen grid of tube T2. The firing of tubes T2 and T3 energizes relays R22 and R24, respectively, by means of a circuit through cam contacts C1. The sensing of the perforation in the 12 zone position results in the firing of tube T8 through the same circuit described above in connection with the sorting of the character A. The firing of this tube energizes relays R38 and R40. The energized R22, R24, R38 and R40 close contacts which upon closure of cam contacts C6 provide a circuit to the 12 sort magnet 111 (FIG. 10e) as follows: From line 163, cam contacts C6 (FIG. 10a), wire 179 (FIG. 10b), relay contacts R56j (normal), contacts R30a (normal), contacts R34a (normal), contacts R22a (transferred), contacts R20e (normal), contacts R24b (transferred), contacts R26g (normal), contacts R28a (normal), wire 181 (FIGS. 10c, 10d), relay contacts R20b (normal), wire 182 (FIG. 10e), relay contacts R24c (transferred), contacts R22c (transferred), contacts R30c (normal), contacts R34g (normal), contacts R38f (transferred), contacts R48e (normal), wires 184 and 185 (FIGS. 10d, 10c), to the 12 sort magnet 111, cam contacts C7 to line 162. Energization of this sort magnet causes selection of the proper distributing blade 90 to send the B card to its assigned pocket.

SECOND SORT

In order to complete the sorting operation and place the B card in its proper sequence, a second sort must be made with the sort selection switch 180 moved to the A2 position, thereby completing a circuit from line 163 through the A2 position of switch 180 and coils of relays R48 and R50 to line 162. The energization of relay R50 closes its R50g contacts to pick up relay R46. The cards are removed from the 12 and X pockets and passed through the machine a second time in the order named.

The tubes T2, T3, and T8 are made conductive as before to energize relays R22, R24, R38 and R40 through cam contacts C1. These energize relays close contacts which provide a circuit to the 0 sort magnet 111 (FIG. 10c) as follows: From line 163, cam contacts C6, wire 179, R56j (normal), relay contacts R30a (normal), contacts R34a (normal), contacts R22a (transferred), contacts R20e (normal), contacts R24b (transferred), contacts R26g (normal), contacts R28a (normal), wire 181, relay contacts R20b (normal), wire 182, relay contacts R24c (transferred), contacts R22c (transferred) contacts R30f (normal), contacts R34g (normal), contacts R38f (transferred), contacts R48e (transferred), wire 186 to the 0 sort magnet 111, cam contacts C7 to line 162. Energization of this sort magnet causes selection of the proper distributing blade 90 to send the B card to the 0 pocket where it is placed above the A card which was specifically sorted on the first pass. It should be noted that relays R46 and R50 which were energized by the A2 setting on the selection switch 180 were not utilized in the circuits for sorting the B card. They are however used in sorting cards having other alphabetic designations when such cards are included in the group of cards to be sorted.

ALPHA-NUMERICAL SORTING

For alpha-numeric sorting the selection switch 180 (FIG. 10a) initially is moved to the N position and the numeric cards are sorted as previously described. The cards having alphabetic characters are classified in the reject, 12, and X, pockets on this sort. The pockets are stripped and the selection switch 180 is moved to the A2 position. The alphabetic cards are placed in the feed hopper with the contents of the reject pocket on bottom followed by the contents of the 12 and X pockets in that order. The alphabetic cards are then sorted as before on the second pass of alphabetic sorting.

SYMBOL SORTING

For sorting cards having symbol designations the sort selection switch 180 is moved to the S position and a circuit is completed from line 163 through the coil of relay R52 to line 162. The energization of relay R52 closes its contacts a through j and p (see FIG. 10c).

Referring again to the card code chart, it is seen that the present (%) symbol, for example, is represented by perforations in the 8 and 4 index point position and in the 0 zone position. From the tube code diagram, it will be seen that the sensing of a perforation in the 8 index position causes tubes T2 and T5 to become conductive and a perforation in the 4 index position causes tubes T1 and T4 to become conductive. The reading of the 8 index position establishes the following circuit: From line 164 (FIG. 10f), through cam contacts C3 (now closed), common brush 181, contact roll 39, contact brush 34, relay contacts R18c (transferred), common bars of emitters E1 and E2; from 8 contact of E1, through jumper 203, relay contacts R56e (normal), wire 175 to the screen grid of tube T5; and in parallel with the path from E1, from 8 contact of E2, relay contacts R56b (normal), wire 172 to the screen grid of tube T2. The firing of tubes T2 and T5 energizes relays R22 and R28, respectively, through cam contacts C1. The reading of the 4 index position establishes a circuit traced as follows: From line 164, through cam contacts C3 to emitters E1 and E2 as above; from 4 contacts of E1, relay contacts R56a (normal), wire 171 to the screen grid of tube T1; and in parallel with the path from E1, from 4 contacts of E2, contacts 5 of E1, jumper 201, contacts 6 of E1, relay contacts R56d (normal), wire 174 to the screen grid of tube T4. The firing of tubes T1 and T4 energizes relays R20 and R26. The sensing of the perforation in the 0 zone position causes tube T6 to become conductive through the following circuit: From line 164, through cam contacts C3 (now closed), common brush 181, contact roll 39, contact brush 34, relay contacts R18c (transferred), common bar of emitter E2, 0 contact of E2, relay contacts R56f (normal), wire 176 to the screen grid of tube T6. The firing of this tube energizes relays R30 and R32. The energized relays R20, R22, R26, R28, R30 and R32 close contacts which provide a circuit to the 7 sort magnet 111 as follows: From line 163, cam contacts C6, wire 179, relay contacts R56j (normal), contacts R30a (transferred), contacts R34b (normal), contacts R38a (normal), contacts R22f (transferred), contacts R28c (transferred), wire 187, contacts R20c (transferred), contacts R26e (transferred), contacts R30e (transferred), contacts R52j (transferred), wire 188 to the 7 sort magnet 111, cam contacts C7 to line 162. Energization of this sort magnet causes selection of the proper distributing blade 90 to send the percent (%) card to the seven pocket. The symbols ampersand (&) and (—) are each represented by a single zone perforation and will fire only a single tube T7 and T8, respectively, to energize relays which complete circuits to the 1 and 4 sort magnets 111.

LENGTH OF FIELD SORTING

A length of field sorting operation is included in this machine in order to segregate the cards into groups according to the number of columns punched in an alphabetical field. The long field group is then sorted first with the shorter field groups added in as their length of field requires. In this manner, the sorting of blank columns is eliminated, thereby saving unnecessary card handling and machine time.

On length of field sorting, the sort selection switch 180 is moved to the LF position and a circuit is completed from line 163 through the LF position of switch 180 and coil of relay R56 to line 162. The energization of relay R56 closes its contacts R56a through R56j (see FIGS. 10b, 10f).

For the length of field sort, the single brush 34 is replaced by a block having a row of eight brushes each designated 35 in FIG. 10f. Each brush 35 is connected to the screen grid of a separate tube T1 through T8 by means of the closed contacts of relay R56. The number of brushes 35 sensing columns with perforations therein determines which tubes are made conductive and the resulting pocket selected. If a perforation is detected by all eight brushes, a potential is placed on the screen grids of tubes T1 through T8 through the contacts R56a to R56h. This fires these tubes and energizes relays R20, R22, R24, R26, R28, R30, R32, R34, R36, R38 and R40. These relays close their respective contacts (FIGS. 10d, 10e) to establish a circuit to the 8 sort magnet as follows: From line 163, through cam contacts C6, wire 179, contacts R56j (transferred), wire 195, contacts R40e (transferred), 8 sort magnet 111, cam contacts C7 to line 162. It is thus seen that the highest order tube, in this case T8, which is made conductive determines the pocket selection since the relay contacts transferred as a result of firing the highest order tube disables the circuit to the remaining sort magnets 111.

CHECKING CIRCUITS

The checking arrangement of this invention compares the operation of a selector plunger 103 with the sort magnet 111 which has been energized to direct a card to the proper pocket. Upon closure of the master switch MS and before energization of relay R10 (FIG. 10a) relay R12 is energized through the following circuit: From line 163, thermal relay contacts R10a (normal), coil of relay R12 to line 162. If cam contacts C10 (FIG. 10g) are not closed, the relay R12 is held energized by a circuit through cam contacts C5 as follows: From line 163, cam contacts C5, relay contacts R12a transferred, hold coil of relay R12 to line 162. If C10 is closed, the relay R12 is held energized by the following circuit: From line 164, cam contacts C10, pick-up coil of relay R12, tube T9 to line 162. The tube T9 is made conductive through the following circuit connection: From line 163, through thermal relay contacts R10a (normal), wire 189 (FIG. 10g), relay contacts R14c, relay contacts R12c (normal), (FIG. 10g), to both grids of tube T9. Depression of the start key 36 starts the machine running as previously described and since the energization of thermal relay R10 transfers its normally closed contacts R10a and closes its normally open contacts R10b, the tube T9 can no longer be fired through the path mentioned above. Therefore, this tube must be made conductive through the checking contacts.

By way of example, let us assume that 7 sort magnet 111 (FIG. 10e) is to be energized. Referring to the timing chart of FIG. 9, it is seen that cam contacts C4 are closed at 110° of each machine cycle to energize relays R42 and R54 which close their contacts a through l and a respectively in FIGS. 10c, d, and e. At 270° of the machine cycle, the cam contacts C6 are closed to energize the 7 sort magnet through circuits previously traced in connection with the sorting of a symbol. Each sort magnet 111 has a condenser 190 associated therewith. The condenser 190 is charged through relay contacts R42j, simultaneously with the energization of the 7 sort magnet, through a circuit similar to the one which energizes the magnet, the remaining plate of the condenser 190 being connected to line 162. At 292½° of the cycle, cam contacts C4 are opened to deenergize the relays R42 and R54 which open their respective contacts. At 344° the checking contacts 134j associated with the plunger 103 under control of the 7 sort magnet 111 are transferred and at 2° in the following cycle, cam contact C8 are closed to place a potential on both grids of tube T9 through the checking contacts 134j as follows: From the condenser 190 of the 7 sort magnet through the checking contacts 134j (transferred) contacts 134k (normal), contacts 134l (normal), cam contacts C8, wire 191, relay contacts R12c (transferred) to both grids of tube T9. This fires tube T9 to provide a holding circuit for relay R12, as previously described, when cam contacts C5 are open. As long as relay R12 remains energized, its b contacts will maintain the holding circuit for relay R14 and the machine will continue to run. It should be noted that cam contacts C4 and C7 are closed early enough in the cycle to insure that all the checking condensers 190 are discharged before the next checking cycle.

In the case where the plunger 103 associated with the 7 sort magnet 111 was not depressed sufficiently, the checking contacts 134j would not transfer and the pulse from the condenser 190 could not reach the grids of tube T9. Thus, when cam contacts C5 open, relay R12 would become deenergized and break the holding circuit for relay R14. Relay R16 in turn would become deenergized and break the motor circuit to stop the machine.

A reset switch S12 (normally open) is located (FIG. 10a) between the +48 volt supply and the hold coil of R12. If the relay R12 is de-energized and stops the machine and it was desired to restart, the switch S12 would be closed to pick up relay R12 through its hold coil and the start switch 36 would be closed to start machine operation as described previously.

Since the blades 90 are positioned one above the other and depression of any blade causes depression of all blades beneath it (FIGS. 7 and 8), the checking arrangement is in addition designed to detect if any blade 90 above the one whose sort magnet was energized was also depressed to cause an error in sorting. For example, if the eight blade was also depressed by its plunger 103, the checking contacts 134k would transfer and present the pulse from the condenser 190 associated with the 7 sort magnet from reaching the grids of tube T9. The motor circuit would be broken as described above to stop the machine.

An additional condenser 194 (FIG. 10c) is provided in the checking circuit to provide a checking pulse to tube T9 when a card is directed to the reject pocket. If, for example, a blank card is fed through the machine, a sort pulse would charge condenser 194 as follows: From line 163, through cam contacts C6, wire 179, relay contacts R56d (normal), relay contacts R20d (normal), contacts R22f (normal), contacts R24f (normal) contacts R26f (normal), contacts R28f (normal), contacts R32a (normal), contacts R36b (normal), contacts R40a (normal) wire 196, contacts R54a (transferred), condenser 194 to line 162. At 292½° of this cycle, cam contacts C4 are opened to deenergize relay R54 which opens contacts R54a. At 2° of the following cycle cam contacts C8 are closed to place a potential on both grids of tube T9 as follows: From condenser 194, checking contacts R134a through R134l (normal), cam contacts C8, wire 191, relay contacts R12c (transferred), to both grids of tube T9. This fires tube T9 to provide a holding circuit for relay R12, as previously described, while cam contacts C5 are open.

While there have been shown and described and pointed out the fundamental novel features of the invention as applied to a preferred embodiment, it will be also understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record sorting machine, a plurality of receiving stations, guide blades associated with the receiving stations for selectively guiding records thereto, means for feeding records through the blades to the receiving stations, and a deflecting member having a leading edge portion positioned in the path of the records at each receiving station for cooperating with the blade leading to that station to direct a record into the station, said leading edge portion being fixed so that an angle is formed between the leading edge of the deflecting member and the leading edge of the record.

2. In a record sorting machine, a plurality of receiving stations, guide blades associated with the receiving stations for selectively guiding records thereto, means for feeding records through the blades to the receiving stations, a deflecting member for each station positioned adjacent said guide blade and cooperating therewith comprising a thin strip bent against itself at an acute angle, each member being fastened across the top of its related receiving station to meet an oncoming record at an angle and having one bent side extending in the plane of said card and the other side projecting downwardly and to the rear, whereby an oncoming record is immediately deflected downwardly into the pocket.

3. In a record sorting machine, a plurality of receiving pockets, a distributing mechanism comprising blades through which records are conveyed to a selected pocket, a separate blade extending to each pocket, means for advancing records in a path through the blades to the pockets, and a deflecting member positioned at each pocket and having a leading edge positioned in the path of said records and disposed at an angle with respect to the leading edge of a record, said blade for each pocket being associated with the forward side of the leading edge of the deflecting member for each pocket whereby said record is positively guided to the first point of contact with said deflecting member.

4. In a sorting machine for record cards having index point positions, means for successively analyzing the index point positions, a distributing mechanism including a plurality of blades, a row of plungers, one being coordinated to each blade, an actuator for moving said plungers against their related blades, an interposer mounted on each plunger and adapted to be selectively moved into cooperation with said actuator, means to move said interposers in accordance with the analysis of said index positions, and means for operating said actuator after said index positions have been analyzed, whereby a selected plunger is moved against its related blade.

5. The machine as set forth in claim 4, in which the means for moving the interposers selectively is controlled by a group of magnets, a separate magnet being provided to control each interposer.

6. In a machine for sorting perforated record cards bearing designations in the form of one or more code perforations arranged in a single card column, a plurality of card distributing blades, a plurality of sensing circuits, each circuit including a circuit closing sensing brush operable each time a perforation is sensed to close one of said sensing circuits, means for feeding said cards past said brush in a columnar direction to and through said card distributing blades, whereby the perforations are sensed by the brush successively, a common blade actuating means, a series of engaging members each related to one of said blades and all associated with said actuating means, means for controlling a selected one of said members to engage said actuating means and operate a related blade, said controlling means including a plurality of electrically responsive devices, a series of normally open circuit connections leading to said devices, and means operable under the control of at least one of the closed sensing circuits for closing one of said open circuit connections, whereby said devices are rendered responsive and the means for controlling a selected member is made effective.

7. In a machine for sorting perforated record cards bearing designations in the form of one or more code perforations arranged in a single card column, a plurality of card distributing blades, a circuit closing sensing brush, means for feeding said cards past said brush in a columnar direction to and through said card distributing blades, whereby the perforations are sensed by the brush successively, a group of electron discharge devices, means for selectively connecting said discharge devices to said sensing brush in a closed circuit for changing the conducting state of said selected electron discharge devices when a perforation is sensed by said sensing brush, a common blade actuating means, a series of engaging members each related to one of said blades and all associated with said actuating means, means for controlling a selected one of said members to engage said actuating means and operate a related blade, said controlling means including a plurality of electrically responsive devices, a series of normally open circuit connections leading to said electrically responsive devices, and means operable under the control of at least one of said electron discharge devices for closing one of said open circuit connections, whereby said electrically responsive devices are rendered responsive and the means for controlling a selected member is made effective.

8. In a machine for sorting perforated record cards bearing designations in the form of one or more code perforations arranged in a single card column, a plurality of card distributing blades, a plurality of sensing circuits, each circuit including a circuit closing sensing brush operable each time a perforation is sensed to close one of said sensing circuits, means for feeding said cards past said brush in a columnar direction to and through said card distributing blades, whereby the perforations are sensed by the brush successively, a common blade actuating means, a series of engaging members each related to one of said blades and all associated with said actuating means, means for controlling a selected one of said members to engage said actuating means and operate a related blade, the controlling means including a plurality of electrically responsive devices, a series of normally open circuit connections leading to said devices, means operable under the control of at least one of the closed sensing circuits for closing one of said open circuit connections, whereby one of said devices is rendered responsive and the means for controlling a selected member is made effective, and a checking circuit for controlling said means for feeding for determining the further operation of the machine controlled by the device which was rendered responsive and the selected member.

9. The machine as set forth in claim 8, in which the checking circuit includes a series of checking contacts each operated separately by an engaging member, a machine control device for sustaining operation of said machine, electrical control means for said control device, and means in circuit with an operated checking contact for controlling operation of said electrical control means when said electrically responsive device and said checking contact are both associated with the same related blade.

10. In a card sorting machine, a plurality of receiving pockets, guide blades associated with the pockets for selectively guiding cards thereto, means for feeding cards through the blades to the pockets, said guide blades being positioned to contact one side of a guided card and including selecting points extending outside the path of card travel, actuating means cooperating with each selecting point to select the desired guide blade, and a deflecting member positioned at each pocket and having a leading edge disposed at an angle with respect to the leading edge of a card, said blade for each pocket being associated with the forward side of the leading edge of the deflecting member for each pocket.

References Cited in the file of this patent

UNITED STATES PATENTS

| | | |
|---|---|---|
| 1,665,595 | Lasker et al. | Apr. 10, 1928 |
| 1,698,844 | Ford | Jan. 15, 1929 |
| 1,930,266 | Ford | Oct. 10, 1933 |
| 2,079,422 | Rabenda | May 4, 1937 |
| 2,123,237 | Ford | July 12, 1938 |
| 2,531,874 | Dean et al. | Nov. 28, 1950 |
| 2,615,569 | Lake et al. | Oct. 28, 1952 |
| 2,616,561 | Luhn | Nov. 4, 1952 |
| 2,708,514 | Maul | May 17, 1955 |
| 2,731,263 | Baril et al. | Jan. 17, 1956 |